United States Patent [19]

Verdon

[11] 3,819,871

[45] June 25, 1974

[54] TELEPHONE SWITCHING AND INTERCOM EQUIPMENT

[75] Inventor: Roger Verdon, Sartrouville, France

[73] Assignee: L'Electronique Appliquee, Montrouge, France

[22] Filed: May 30, 1972

[21] Appl. No.: 257,604

[52] U.S. Cl. .................... 179/27 F, 179/40, 179/99

[51] Int. Cl. ............................................ H04q 3/00

[58] Field of Search ......... 179/27 F, 27 CA, 40, 99, 179/18 BD

[56] References Cited

UNITED STATES PATENTS

| | | | |
|---|---|---|---|
| 3,327,064 | 6/1967 | Braund et al. | 179/27 CA |
| 3,363,062 | 1/1968 | Hohmann, Jr. et al. | 179/18 AD |
| 3,384,717 | 5/1968 | Coston | 179/27 CA |

*Primary Examiner*—Thomas W. Brown

*Attorney, Agent, or Firm*—Kemon, Palmer & Estabrook

[57] ABSTRACT

A telephone switching and intercom equipment comprises an operator's position and a plurality of subsidiary positions. Each position is provided with a direct position selection key-board including for at least some of the positions, an external line access request key. Each actuation of a request key temporarily opens the conversation line of the position and activates, in a call marker device, a called position marking output, or an external line request marking output. The conversation line of each position is connected to a call marker connecting circuit responsive to a closure of the line, a temporary opening thereof and the activation of a call marker output to which it is connected. A single one of a plurality of intercom connecting circuits is active, at any time, for authorizing the control from the call marker connecting circuits of as many intercom routing blocks connected thereto as there are positions. A plurality of external line connecting circuits are so chained that the first unoccupied one reached by an external line request is active for authorizing the control from the said marker connecting circuits of as many external line access blocks connected thereto as there are positions. Each position is provided with a visual display of the occupancy conditions of the positions and a total occupancy of the external lines.

13 Claims, 10 Drawing Figures

TELEPHONE SWITCHING AND INTERCOM EQUIPMENT

The present invention concerns improvements in or relating to telephone switching and intercom equipment of the kind comprising . . . A telephone switching and intercom equipment comprising an operator's position and a plurality of subsidiary positions, intercom position connecting circuits each having a conversation line extention selectively connectable to the position conversation lines and external line connecting circuits each having direct accessing to and from the operator's position and each having direct accessing from subsidiary positions through conversation line extensions selectively connectable to the position conversation lines; each position being provided with hook controlled work contact for closure of the conversation line of the position and subsidiary positions beng provided with external line connection dialing means; said operator's position being provided with keyboard actuated facilities for direct position selections, external line selections and temporary holdings of communications from the external line.

An object of the invention is to provide a telephone switching and intercom equipment such that any and all intercom communications and external line allocation requests are operated on a keyboard direct selection basis for all positions.

A further object of the invention is to provide said telephone switching and intercom equipment such that each position comprises visual display monitoring of the complete condition of all positions and external line circuits of the equipment.

Briefly summarized, the organization of such an equipment may be described as follows:

Each position comprises a keyboard of as many keys as there are positions. The operator's position additionally comprises as many further keys as there are external line connecting circuits and part at least of the subsidiary positions each comprises an external line connecting circuit request key. Each key, when actuated, temporarily opens the conversation line of the position, which has been previously closed from the hook contacts of the position, and activates a distinctive output of a call marker device. As many call marker connecting circuits as there are positions are each connected to the conversation line of a position and to a position corresponding output of the call marker device. Each call marker connecting circuit is responsive to the three following conditions.

closure of its conversation line, temporary opening of its conversation line, and activation of its call marker position corresponding output.

Each intercom connecting circuit, and each external line connecting circuit, each comprises a relay circuit from which are controlled as many communication establishing blocks (intercom communication routing blocks or external line access blocks) as there are positions. All the blocks through which passes the same conversation line of a position are controlled from the call marker connecting circuit connected to said conversation line.

BRIEF DESCRIPTION OF THE DRAWINGS

These and further objects and features of the invention will be described in full detail with reference to a specific though not limitative example of reduction to practice, as illustrated in the accompanying drawings, wherein.

DETAILED DESCRIPTION

Figure 1:
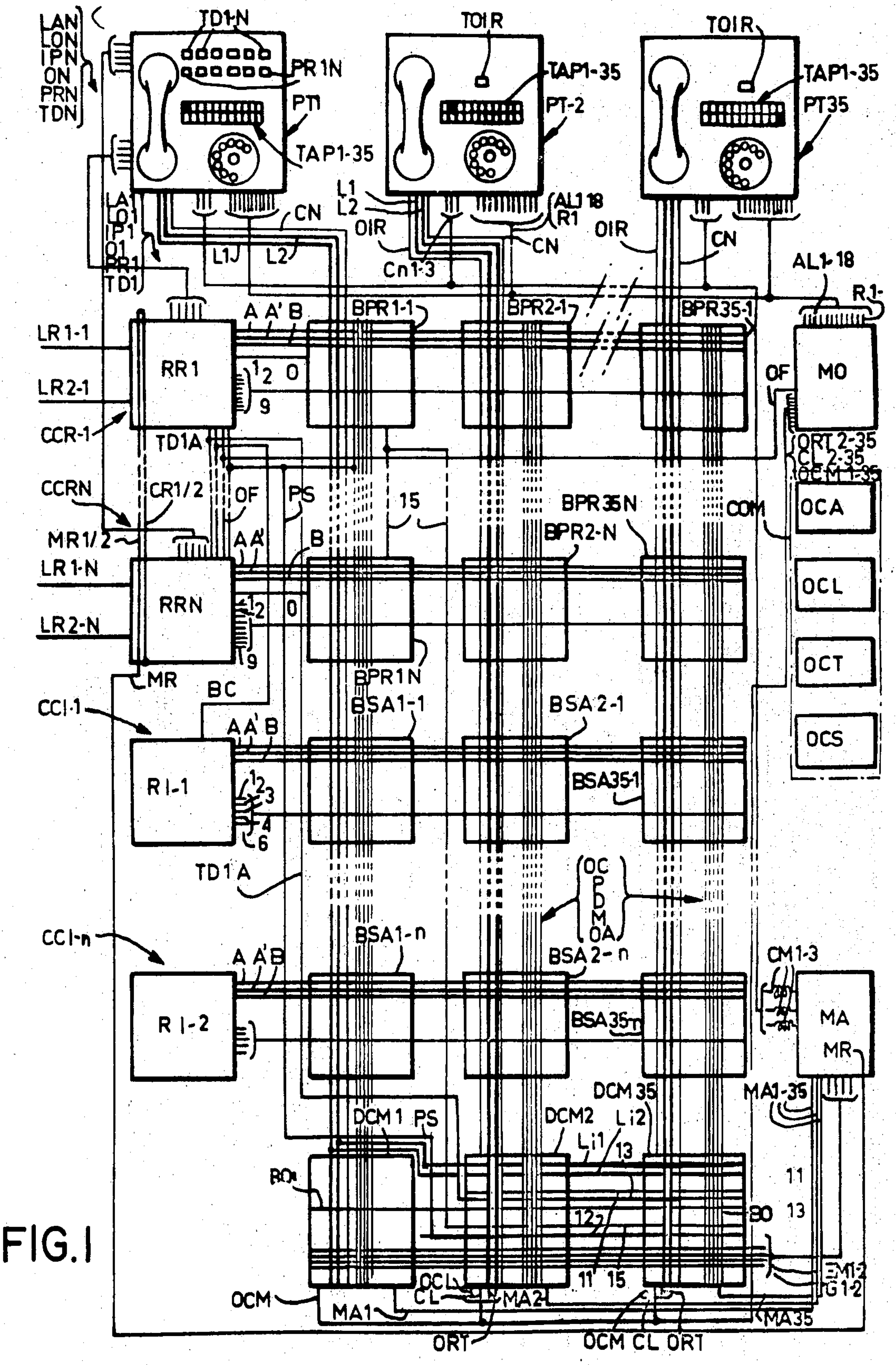
FIG. 1 shows a diagram of organization of the equipment.

The illustrated equipment includes a plurality of telephone set positions, from PT1 to PT35. PT1 is the operator's set and PT2 to PT35 are subsidiary or satellite sets. Only PT1, PT2 and PY35 are shown, the total number of the sets obviously being 35 in the illustrated example. A switching rack, to which said positions are connected, receives N telephone network lines, the first and the last of which are shown only by their conductors or wires LR1–1, LR2–1 and LR1–N and LR2–N respectively. To each one of such external lines is associated a network connecting circuit CCR1 to CCRN, only the first and last of which are shown in FIG. 1 of the drawings. Each network connecting circuit CCR includes external line relay means such as RR1 and RRN and a plurality of network access blocks BPR of identical in number, in this example, to the number of positions though it may be understood that it may be smaller when part of the positions are provided so as not to have direct access to the network. These blocks are shown from BPR1–1 to BPR1–35 for the relay means RR1 and from BPR1–N to BPR35–N for the relay means RRN.

The switching rack further includes a plurality of internal connection establishment circuits, from CC1–1 to CC1–n, only the first and last of which are shown. The number of such circuits is dependent on the conditions of implementation of the equipment. Each one of said circuits includes local communication control relay means, from R1–1 to R1–n and 35 call selection and routing blocks such as BSA1–1 to BSA35– for relay means R1–1 and BSA1–n to BSA35–n for relay means R1–n.

The rack further includes 35 marker connecting circuits, from DCM1 to DCM35, which are respectively associated with the positions PT1 to PT35. It also includes a call marker device MA, an occupancy marker device MO and a common organization COM comprising: call timing generator OCA, an interrupted voltage generator OCC, a tone signal generator OCT and an emergency battery voltage supply OCS, such for instance as a generator supplying a transformer itself feeding a rectifier for a 25 volts D.C. output.

Interconnecting conductors between the above identified circuits are shown, such conductors being drafted in heavy lines for the talk conveyor conductors and in thinner lines for the other ones.

Each telephone set is connected to the rack by two conversation conductors L1, L2 passing through all the corresponding blocks BPR and BSA and through the DCM circuit allotted to said position. Additional conversation conductors Li1 and Li2 extend the conductors L1 and L2 of the operator's position through the DCM2 to DCM35 circuits. Each CCR circuit and each CC1 circuit is provided with three conversation conductors A, A' and B interconnecting all the blocks of the circuit to the relay means of said circuit. Each telephone set is provided with a dialling signal conductor passing through all the blocks BPR, BSA and DCM allotted to said set. Each satellite set is further provided with an individual network occupancy conductor OIR passing through all the blocks BPR and BAS, and through the circuit DCM belonging to said set. Further each telephone set is connected to the occupation marker device MO through eighteen conductors and a return conductor R1 for the control of lights in said sets, which will be hereinafter described. Three conductors CM1, CM2 and CM3 connect the call marker device MA to all the telephone sets in parallel relation thereof.

The operator's set is connected to each network line relay RR through a group of six conductors such as LA1, LO1, IP1, O1, PR1, TD1 connected to the relay means RR1 for the relay means RR1 and such as LAN, LON, IPN, ON, PRN, TDN connected to the relay means RRN.

The blocks which are associated with the same telephone set are interconnected through a group of five conductors OC, P, D, M and OA. The DCM circuits are respectively connected to the marker MA by conductors MA1 to MA35. Conductors EM1, EM2, G1 and G2 extend through all the DCM circuits to the marker MA. Two conductors 11 and 13 interconnect the DCM2 to DCM35 circuits, the conductor 11 being an extension of a conductor CAD from the common signal generator circuits COM. Another conductor BO extends through all the DCM1 to DCM35 circuits. A further conductor 15 extends through the DCM2 to DCM35 circuits and is connected to all the BPR1 circuits associated with the operator's set PT1. A conductor PS is connected to the conductor P of the blocks BPR and BSA from PT1, to all the blocks RR and to the DCM1 circuit from which it issues as conductor 12 passing through the other circuits to the marker device, from DCM2 to DCM35.

All the DCM circuits are further connected to the occupancy marker device MO through a conductor OCM and, but for the DCM1 circuit, through conductors CL and ORT.

To all the relay means RR are connected conductors TD1A, BC and OF respectively connected to the conductor 13 passing through the DCM2 to DCM35 circuits, to the first relay means RI-1 and to the occupancy marker device MO.

Each relay means RR is connected to the first of its associated block BPR through a conductor O. Nine conductors, numbered from 1 to 9 all the elements of a network connecting circuit CCR, i.e. the relay means and blocks BPR1 to BPR35 in said network. Similarly, in each circuit CC1, five conductors 1, 2, 3, 4 and 6 interconnect the relay means R1 thereof and the BSA circuits thereof.

Further control conductors existing in the equipment are not shown in FIG. 1 for the sake of clarity. They will be described with reference to the other figures in which they appear.

Figure 2:
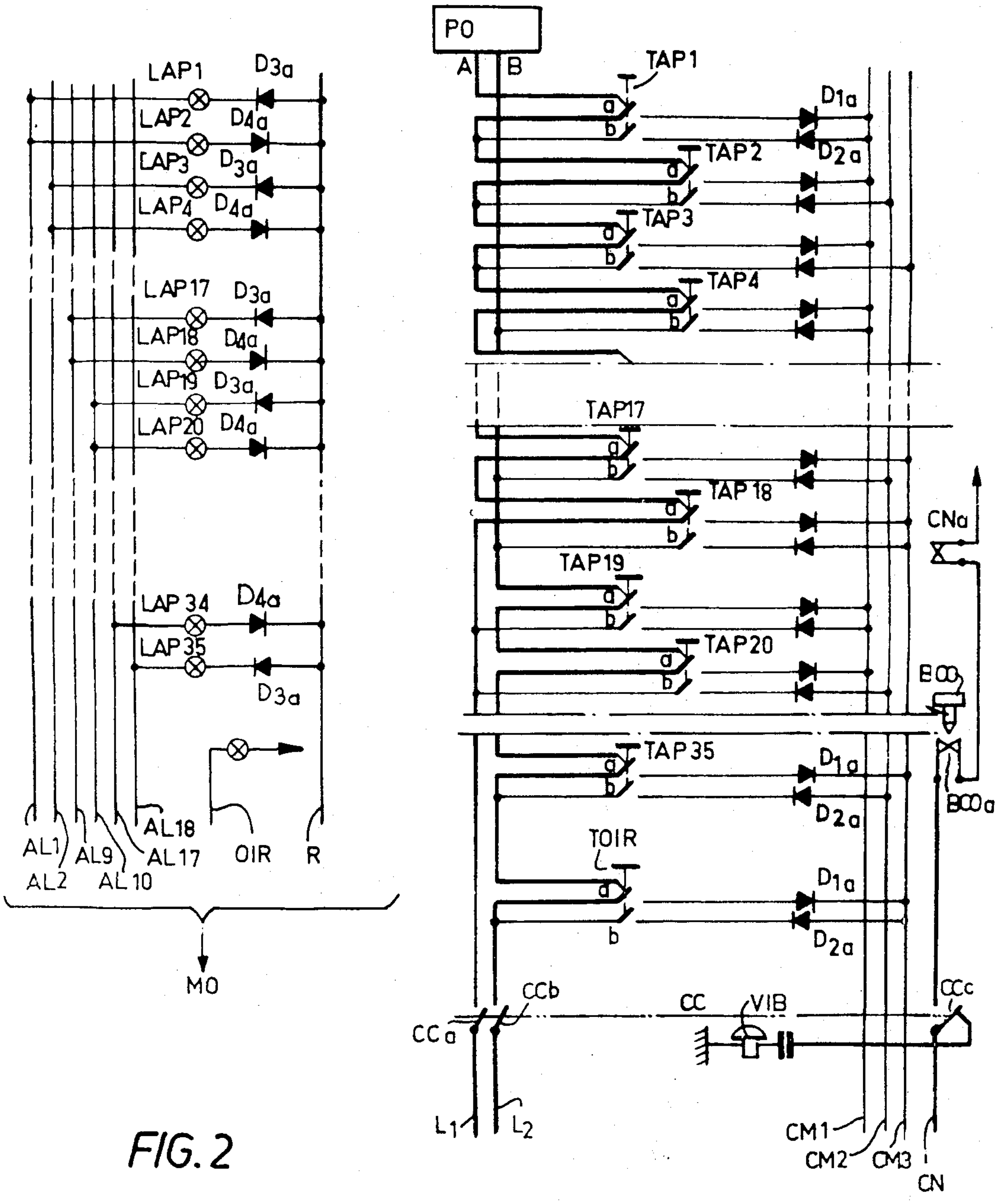
FIG. 2 shows the circuitry of a subsidiary position of the equipment.

FIG. 2 shows the circuits in a satellite telephone set position, from PT2 to PT35. It includes a network connection key TOIR and 35 local call keys, from TAP1 to TAP35, respectively corresponding to the 35 telephone set positions of the equipment. Each key is of an automatic return to rest position type and controls two contacts *a* and *b*. The contacts *a* of the 18 first local call keys TAP1 to TAP18 are normally closed rest contacts which are serially interconnected between the output A of a conventional operative set PO, comprising an induction coil and a transmitter-receiver device (handset for instance. Contacts *a* of the keys TAP19 to TAP35 are also normally closed rest contacts which are serially interconnected between the output B of PO and the conductor L2. Normally open contacts CCa and CCb are provided in the conductors L1 and L2 for actuation from the commutator switch CC of the handset.

When actuated, a contact *a* is connected through a unidirectional element such as a diode D1a to one of the conductors CM. Each contact *b* is a work contact connected between one of the conductors L1, L2 and one of the conductors CM1, CM2, CM3 through a unidirectional member D2*a*, of reverse conduction with respect with that of D1*a* associated to contact *a*. Illustratively, contact *a* of TAP1, when in its work condition, closes a circuit between the conductors L1 and CM1 as well as the contact *b* of the same key TAP1; contact *a* of TAP2 is connected between the conductors L1 and CM1 whereas contact *b* is connected between the conductors L1 and CM2; contact *a* of TAP3 is connected between the conductors L1 and CM1 and contact *b*, between the conductors L1 and CM3; contact *a* of TAP4 is connected between L1 and CM1 and contact *b*, between L2 and CM1. Not all the keys are shown in FIG. 2 for the sake of simplicity: FOR TAP17, contact a is connected between L1 and CM3 and contact *b* between L2 and CM2; for TAP18, contact *a* is connected between L1 and CM3 and contact b, between L2 and CM3; for TAP19, contact *a* is connected between 12 and CM1 and contact *b* between L1 and CM1; for TAP20, contact *a* is connected between L2 and CM1 and contact *b* between L1 and CM2; for TAP35, contact *a* is connected between L2 and CM3 and contact *b* between L2 and CM2. From the above, the connecting law is easily deduced, for any other key.

The key TOIR also controls two similar contacts *a* and *b*, contact *a* being, in the rest condition of said key, serially connected with the contacts *a* of the other keys and the conductor L2. When in work condition, said contact *a* connects L2 and CM3 through a diode D1*a*. Contact *b* is a work contact connected between L2 and CM3 through a diode D2*a* of reverse polarity with respect to D1*a*.

Lamps, gving for instance a "white" light, are associated with and actually embodied within the keys. Some of these lamps are shown in FIG. 2, LAP1 to LAP4, . . . , LAP17 to LAP20, . . . LAP34 and LAP35.

Said lamps are connected selectively to one of the 18 conductors AL1 . . . AL18 fom the occupancy marker device MO and the return conductor R1, through series diodes such as $D3_a$ and $D4_a$. Illustratively, lamp LAP1 is connected across the conductors AL1 and R1 through a $D3_a$ diode whereas LAMP2 is connected across the same conductors through a $D4_a$ diode of reverse polarity with respect to $D3_a$. Similarly LAMP3 and LAMP4 are connected across AL2 and R1 through oppositely connected diodes $D3_a$ and $D4_a$. Similarly again, LAP17 and LAP18 are connected a cross AL9 and R1 through reversed polarity diodes, LAP19 and LAP20, across AL10 and R1 through reversed polarity diodes, LAP34 across AL17 and R1 through a $D4_a$ diode, and finally LAMP35 across AL18 and R1 through a $D3_a$ diode.

A "red" lamp TOIR is associated with, and actually embodied within the TOIR key, which lamp is connected across the negative pole of the battery and the ORI conductor. Said lamp indicates a network occupancy of the network, a signalling that a call comes from the network, or else, a complete occupancy of the lines of the network connected to the equipment.

A contact CNa is controlled from the dial or other device of the set controlling the generation of dialing impulses. Said contact is connected to the battery and serially connected with a normally closed contact BCOa which may be actuated from a cutoff pushbutton BCO and the dialing conductor CN through a normally open contact CC*c* which is actuated from the commutator switch of the telephone set. The moving blade of said last contact is connected to a buzzer VIB to the ground (impedance of VIB of about 2,000 ohms). In the telephone set, the dial may be replaced by a keyboard actuated impulse electronic generator.

Figure 3:
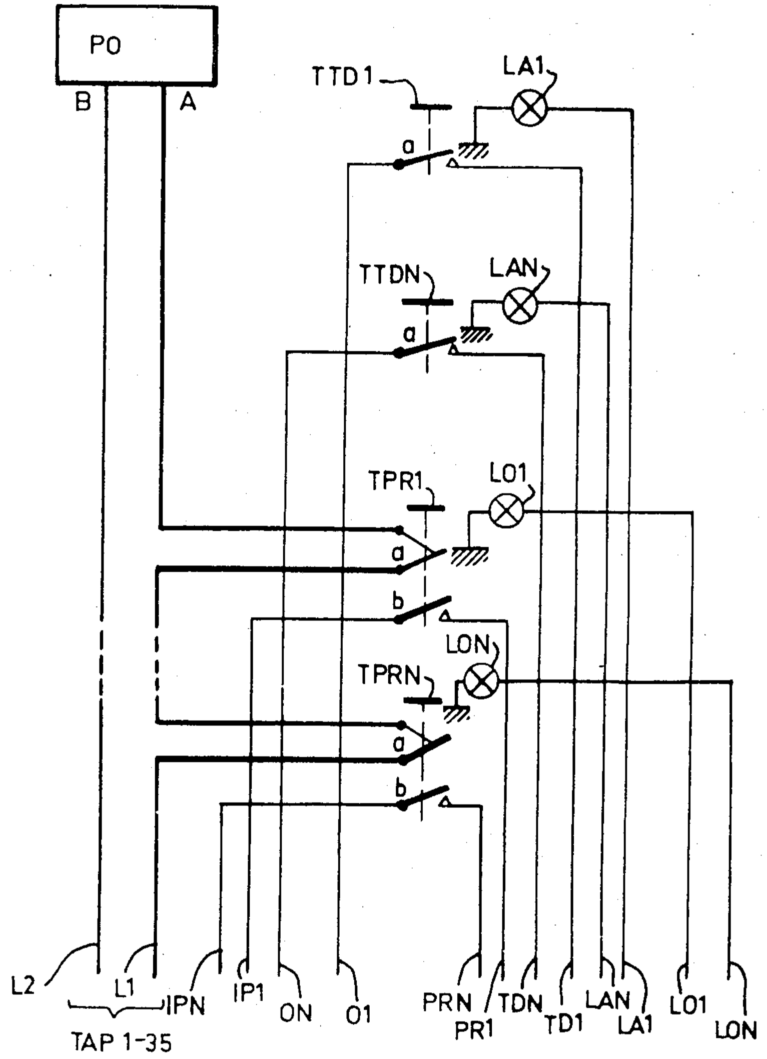
FIG. 3 shows the circuitry of the operator's position.

FIG. 3 shows an example of the circuits for the operator's position set in the equipment. It must be understood that this set comprises, though not shown, all the elements of a satellite set with the omission of the key TOIR and the corresponding lamp LOIR. On the other hand, additional circuitry is provided for an operator's set, connected across PO and the conductors L1 and L2 which are connected to the various local call keys TAP.

The set comprises N transfer keys TTD1 . . . TTDN associated to the N network connecting circuits. Each of such keys controls a normally open contact *a* connected across a conductor O and a conductor TD: contact *a* of TTD1 is connected across O1 and TD1, and similarly, contact *a* of TTDN is connected across ON and TDN. Each key embodies a display and call lamp, from LA1 to LAN, of a further light color, for instance green, connected across the ground and the corresponding reference conductors LA1 to LAN.

The set also comprises N keys for network establishment connections, from TPR1 to TPRN, respectively associated to the N CCR networks. Each one of these keys controls two contacts *a* and *b*, contacts *a* being normally closed and serially interconnected across the output A of PO and the conductor L1 connected to the keys TAP. Contacts *b* are normally open and connected across the conductors IP and PR: contact *b* of TPR1 across IP1 and PR1, . . . , contact *b* of TPRN across IPN and PRN. The keys embody lamps giving for instance a red light for signalling occupation, said lamps being connected across the ground and the conductors of same reference LO1 . . . LON.

The detail of the remaining blocks and circuits will now be given with respect to a progressive explanation of the operation of the equipment. Generally speaking, depression of any key, except the keys TD in PT1, opens the conductors L1 and L2. When a handset is unhooked at any position, nothing more happens than a loop connection of L1 and L2. A ring current then may be sent when at least one of the CC1 circuit is free.

Figure 8:
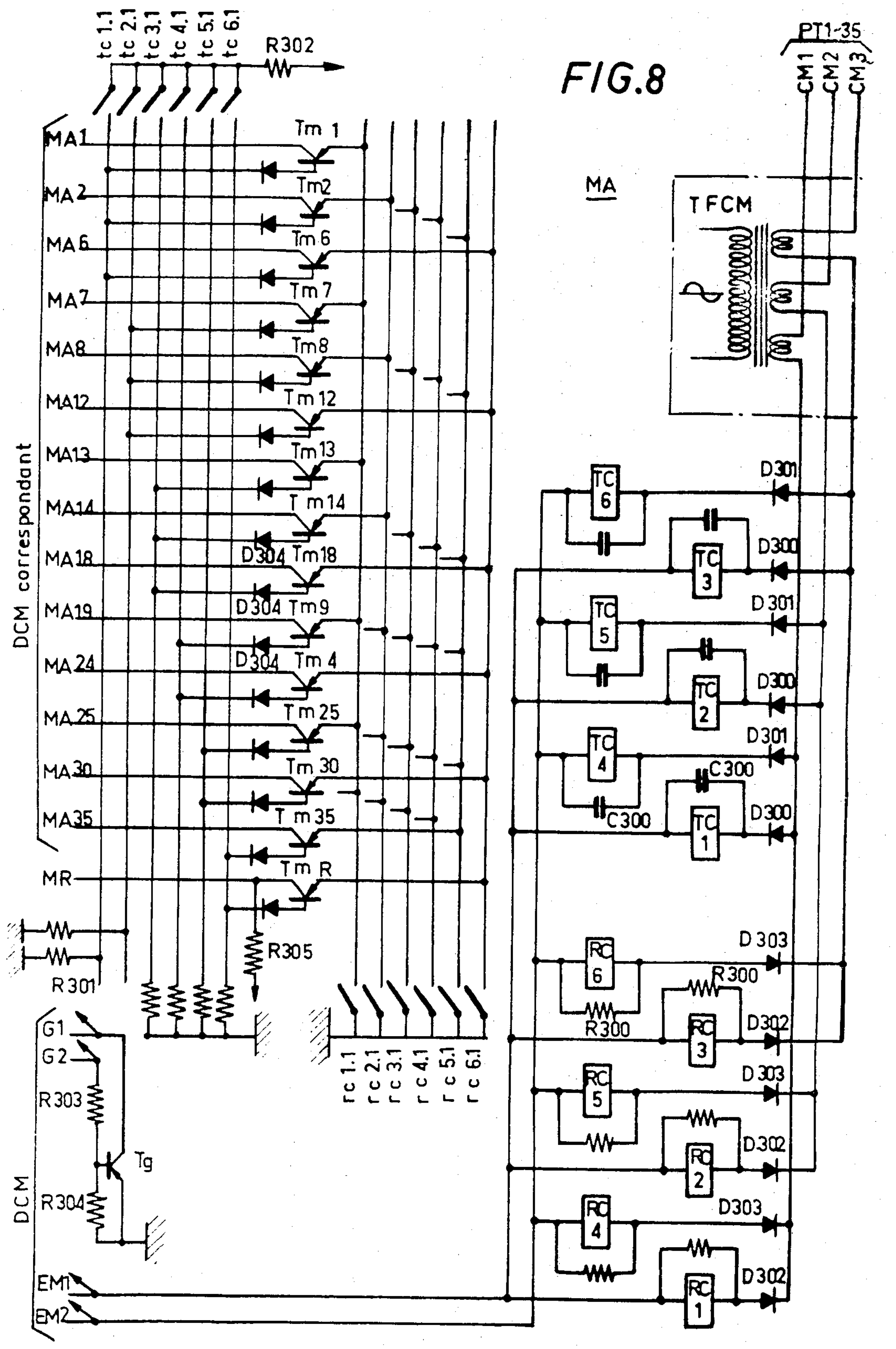
FIG. 8 shows an example of circuit of a call marker device.

Call marker device MA - FIG. 8

Depression of a key TAP or of the key TOIR is a satellite set, or of a key tap on the operator's set, connects the conductors L1 and L2 to the conductors CM1, CM2, CM3 through the contacts a and *b* of said keys and the diodes D1*a*, D2*a*. In the corresponding DCM circuit, FIG. 7, the conductors L1 and L2 are connected to the two conductors EM1 and EM2 connected to the call marker device Ma, through respective connections passing through rest contacts *cca*1, *cca*2 of a relay CCA and resistances RO28 and RO29.

As shown in FIG. 8, the three conductors CM1, CM2 and CM3 are respectively connected to three secondary windings of a transformer TFCM fed from the mains.

MA includes six relays RC1 to RC6 each of which is shunted by a resistance R300, and six relays TC1 to TC6 each of which is shunted by a condenser C300. The relays TC1, TC2 and TC3 are respectively connected to the three transformer secondaries and the conductors CM1, CM2 and CM3 through respective diodes D300, and they are all connected to a conductor EM1. Similarly, the three other relays TC4, TC5 and TC6 are connected respectively to the said three secondaries and the three conductors CM1, CM2 and CM3 through respective diodes D301 and they are also connected to the conductor EM2. The cathodes of the six diodes are connected to the relay coils and their anodes to the conductors CM. The relays RC1, RC2 and RC3 are directly connected to the conductor EM1 and respectively to the three secondaries and the conductors CM1, CM2 and CM3 through three diodes D302 serially connected with the coils of said relays. Similarly, the three other relays RC4, RC5 and RC6 are connected to the conductor EM2 and respectively through series-connected diodes D303 to the said secondary windings. The anodes of the six diodes D302 and D303 are connected to the relay coils and their cathodes to the secondary windings.

The relays RC respectively control work contacts rc1.1 . . . *rc*6.1 the moving blades of which are grounded, and which are respectively connected to the emitters of 36 transistors from T*ml* to T*m*35 and T*m*R. FIG. 8 shows that the contact *rc*.1.1 is connected to the emitters of the transistors T*m*1, T*m*7, T*m*13, T*m*19, T*m*25, etc . . . ; that the contact *rc*.2.1 is connected to the emitters of the transistors T*m*2, T*m*8, . . . etc . . . The bases of said transistors are respectively connected through diodes D304 to the ground through resistances R301 and to work contacts *tc*1.1, *tc*2.1, . . . *tc*6.1 of the respective relays TC1, TC2, . . . TC6, the moving blades of said contacts being supplied from a battery through a resistance R302.

The collectors of the transistors Tm1 to Tm35 are respectively connected to the conductors Ma1 to MA35 connected to the circuits DCM1 to DCM35. The collector of TmR is connected to the conductor MR and to the battery through a resistance R305.

Consequently, when a key TAP or TOIR is depressed, the transformer CM feeds a supply to the circuit and a pair of relays RC and TC are controlled to work condition according to the orientation and connection of the diodes of the selected combination and the direction of the alternation of the A.C. current.

When relay RC comes first to work, it does not maintain up to the next alternation and nothing happens. On the other hand relay TC maintains its actuation between two successive alternations, from its shunt condenser C300 and, when relay RC comes to work at the next alternation, both the contacts of said relays are closed. When for instance, key TAP2 is depressed and closes its *a* and *b* contacts, FIG. 2, the conductors CM1 and CM2 are connected to the conductor L1, i.e. to conductor EM1; consequently relays RC2 and TC1 which are the sole relays connected across EM1 and CM1, CM2, are the sole relays actuated to work and the closure of the contacts *rc*.2.1 and tc1.1 results in controlling the transistor T*m*2 to conduction, all other transistors remaining blocked, because only T*m*2 has its base to the battery through *tc*.1.1 and its emitter to the ground through *rc*.2.1. Ground is applied to the corresponding conductor MA2.

When the key TOIR is depressed in a satellite set, the conductors CM3 and L2, i.e. EM2, are interconnected and, in such a condition, relay RC6 and TC6 are brought to work: the transistor TmR is brought to its conduction state, and the conductor MR is connected to the ground.

Figure 9:
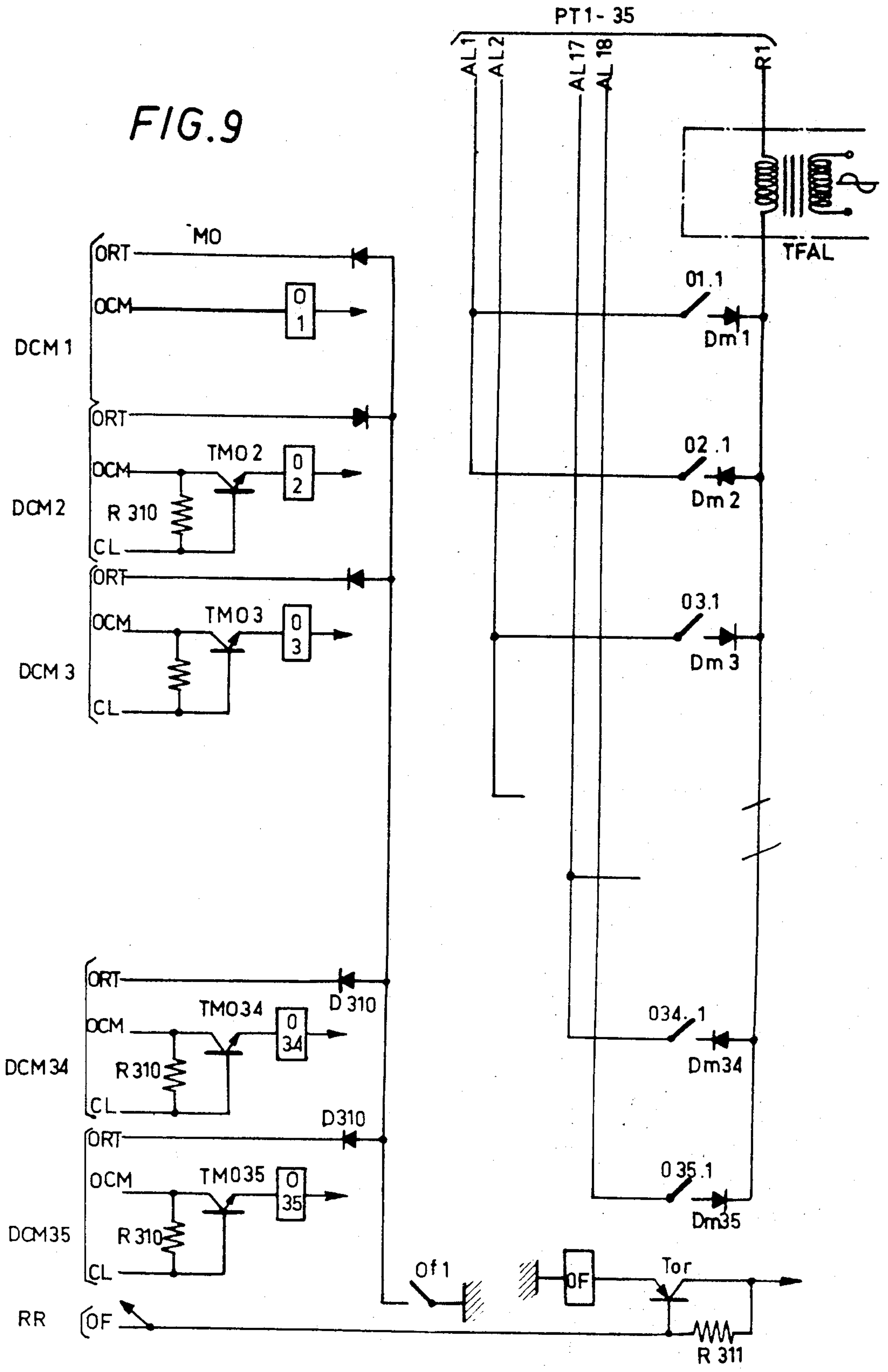
FIG. 9 shows an example of circuit of an occupation marker.

Occupancy marker device MO - FIG. 9

A conductor OCM connects each DCM circuit to MO. As soon as the telephone set to which a DCM is associated is occupied, a ground is applied to said conductor OCM which is connected to the collector of a transistor TMO (from TMO2 to TMO351, of the NPN type the base of which is connected to a conductor CL and the emitter to a corresponding relay coil from 02 to 035 to the battery. A resistance R310 is connected between the base and collector of each one of the transistors TMO. In DCM1, related to PT1, the conductor OCM is directly connected to relay 01.

Relays 01, . . . , 035 control work contacts *o*1.1, . . . , *o*35.1, which are respectively serially connected with diodes Dm1, . . . Dm35. Said contacts and diodes are connected across the return 0conductor R1 in which is serially connected a secondary winding of a transformer TFAL, and the 18 conductors A11 to AL18. The diodes D*m*1 and D*m*2 are of reverse directions of connection and so forth in alternations from diode to diode up to Dm35. When one of the relays 01, . . . L35 comes to work, a connection is thus ensured between the conductor R1 and one of the conductors AL which, according to the direction of conduction of the concerned diode, lights one of the two lamps LAP, FIG. 2, connected to the same AL conductor. When, for instance, relay 01 is activated, its contact *o*1.1 closes and the following circuit is closed: from the secondary winding of TFAL through conductor R1, diode $D3_a$ of FIG. 2, lamp LAP1, condcutor AL1, closed contact *o*1.1, diode Dm1 to the other end of the transformer winding.

Consequently, each time one of the telephone sets is occupied, the corresponding relay O is actuated, ground is applied to the conductor OCM and, in each position, the corresponding lamp LAP is lighted for displaying an occupied condition of the occupied position in the equipment to all the other positions.

Operation of a satellite set:

a. Establishment of a local communication:

Depression of a TAP key corresponding to the desired correspondant in such a satellite set produces, as previously described, application of the ground to the corresponding MA conductor from the marker device. Conductors MA1, . . . , MA35 are respectively connected to the DCM1, . . . , DCM35 circuits.

Figure 6:
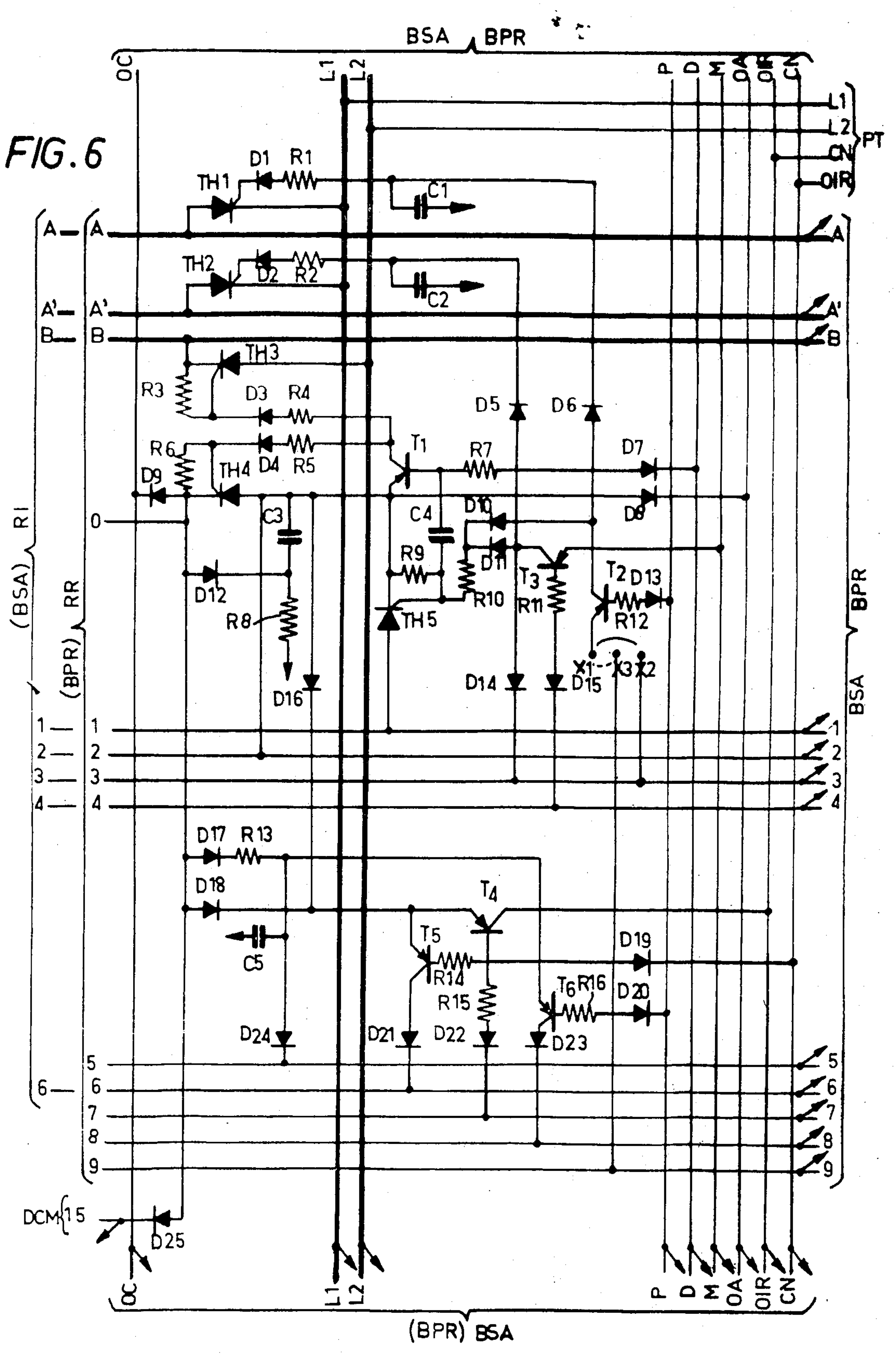
FIG. 6 shows the circuitry for a intercom and routing block and for a external line access block in the equipment.
Figure 7:
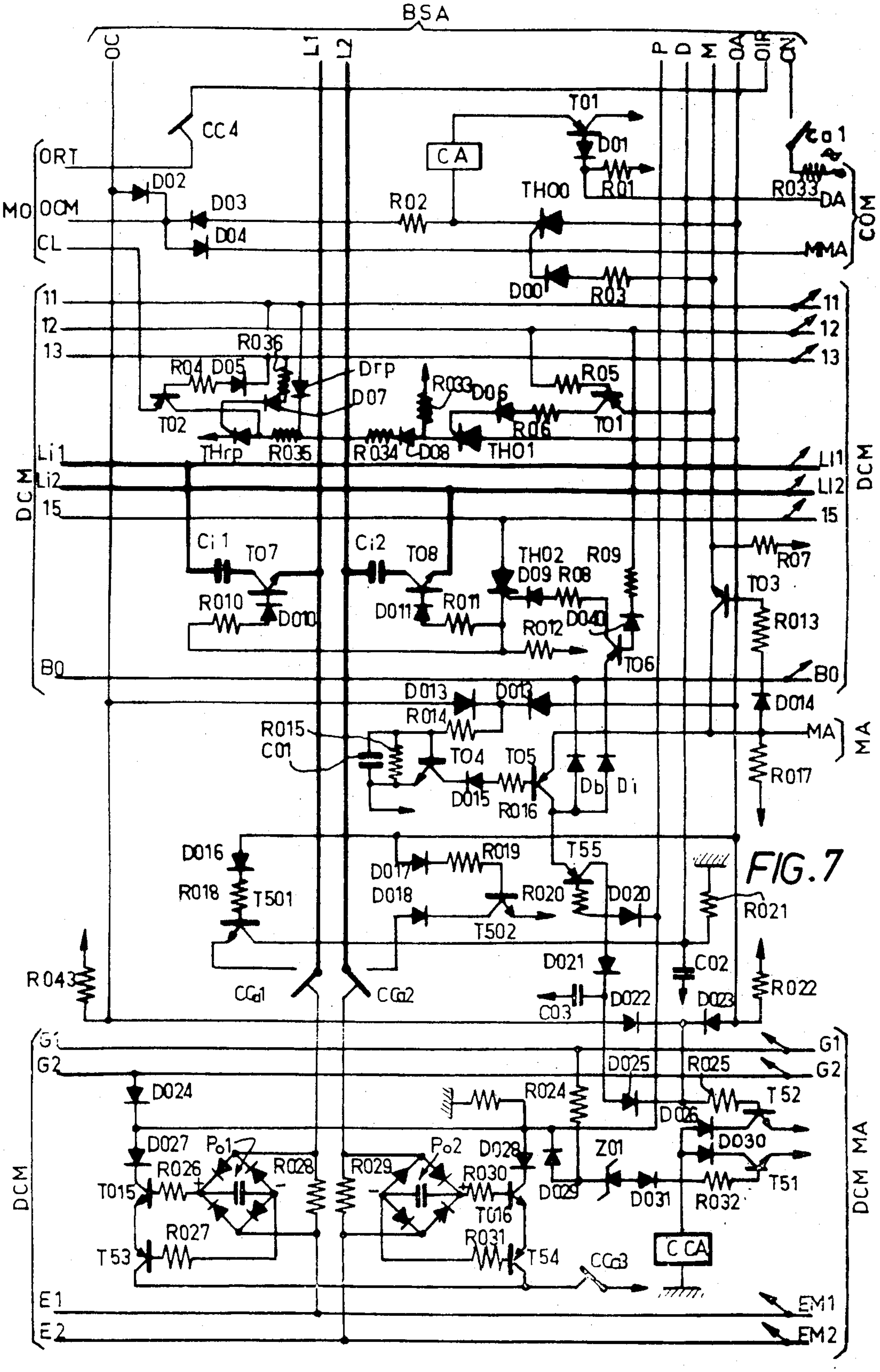
FIG. 7 shows the circuitry of a call marker connecting circuit.

In the DCM circuit corresponding to the called position, FIG. 7, the conductor MA is connected to the battery through a resistance R017 to the base of the transistor TO3, through a diode DO14 and a resistance R013 to the collector of T03, and to the emitter of a transistor T05. The emitter of T03 is connected to the battery through a resistance R07 and to the conductor M. When the called position is unoccupied, the transistor T05 is blocked and consequently T03 is switched to conduction, transferring the ground from MA to M. Said conductor M is connected to all the BPR and BSA circuits, FIG. 6, and, in each of these circuits, it is connected to the emitter of a transistor T3 the base of which is connected through a resistance R11 and a diode D15 to the conductor 4. A single conductor 4 is connected to the battery in all the CCI circuits As seen from FIG. 5, the conductors 4 are connected in the circuits RI, to the ground through a resistance R212 and to the emitter of a transistor T206 the collector of which is connected through a diode D213 to a conductor C2 connected to the emitter of a transistor T207. The collector of T207 is connected to the conductor C1 and its base through a resistance R211 and a diode D211, to the junction point of a diode D212 connected to the conductor 4 and of a diode D209 connected to the point connecting the resistance R210 and the diode D210. The common point of the three diodes D209, D211 and D212 is connected to the collector of a transistor T201 the emitter of which is grounded.

The conductor C2 of a RI circuit is connected to the conductor C1 of the preceding RI circuit and so on from circuit to circuit up to the emitter of a transistor Tc the collector of which is connected to the battery and the base connected to the conductor BC and to the battery through a resistance R202.

In only one of the circuits CCI, the transistor T206 is conducting and consequently the conductor 4 is connected to the battery through TC. Consequently only one transistor T3 will be unblocked, i.e., the one corresponding to the BSA of the called position in the available CCI circuit. Said transistor T3 comes to conduction and as its collector is connected to the conductor 3 through a diode D14, a conductor connected to the battery through a resistance R213 of the RI circuit, said conductor 3 then receives the ground. Further, the collector of the transistor T3 is connected through a diode D11 and a resistance R10 to the trigger electrode of a thyristor TH5, said trigger being connected to the cathode of said thyristor through a resistance R9. It is also connected to the battery through a diode D5 and a condenser C2. Consequently, the switching of the transistor T3 to its conduction condition produces the activation of the thyristor TH5 and the charge of the condenser C2. As the cathode of TH5 is connected to the anode of a diode D16 the cathode of which is connected to the emitters of the two transistors T4 and T5, the ground is applied to the emitter of the transistor T5 the base of which, connected through a resistance R14 and a diode D19 to the dialling conductor CN, is connected to the battery. The transistor T5 comes conducting and, as its collector is connected to the conductor 6 through a diode D21, this ground is applied to the said conductor 6.

Considering FIG. 7, it is seen that in the DCM circuit, the resistances R028 and R029 are respectively serially connected across the line conductor L1 and the conductor EM1, on the one part and across the line conductro L2 and the conductor EM2 on the other part. Two rectifier bridges PO1 and PO2 are respectively connected across the resistances R028 and R029. The positive terminal of the bridge PO1 is connected through a resistace R207, to the base of a transistor T015 whereas the negative terminal of the said bridge is connected through a resistance R027 to the base of another transistor T53 series-connected with the transistor R027. Similarly, the positive and negative poles of the other bridge P02 are respectively connected, through respective resistances R030 and R031, to the bases of the series-connected transistors T016 and T54. The collectors of the transistors T015 and T016 are connected to the conductor P, through respective diodes D027 and D028, whereas the collectors of the transistors T53 and T54 are connected to the battery through a rest contact cca3 of the relay CCA.

Consequently, in the DCM circuit of the calling position, the alternating current applied to the line L1 or L2 produces across the resistance R028 or R029, an A.C. voltage drop which is rectified by the corresponding bridge P01 or P02 for controlling conduction of the two transistors T015 and T53 or T016 and T54. As the relay CCA remained at rest, contact cca3 is closed and the battery is consequently applied to the conductor P of the calling position.

In each of the BPR and BSA circuits, the conductor P is connected to the base of a transistor T2 through a diode D13 and a resistance R12. The emitter of said transistor is connected to the conductor 3 through a junction established between two terminals X1 and X2. Consequently, the battery applied to the conductor P applies a bias to the bases of all the transistors T2 of the BSA circuits of the same column (in the drawing) but only the transistor T2 in the BSA which is concerned with the call, the emitter of which is connected to the conductor 3 on which the ground has been appplied, turns to its conductive state. As the collector of T2 is connected to the battery through a diode D6 and a condenser C1, and to the trigger electrode of the thyristor TH5 through a diode D10 and a resistance R10, the condenser C1 charges through D6 and the thyristor TH5 is triggered. Both thyristors TH5 of the two BSA circuits corresponding to the calling and called positions feed in parallel fashion on the conductor 1. The conductor 1 is grounded in the RI circuit, FIG. 5, as it is connected to a rest contact *sa*2 of a relay SA, which contact is connected to the ground. The cathode of TH5 is connected to conductor OA through a diode D8.

In the DCM circuit of the called position, FIG. 7, the conductor OA is connected to the anode of a thyristor THOO the trigger electrode of which is connected to the conductor M through a diode DOO and a resistance RO3. The cathode of THOO is connected to the coil of a relay CA and to the conductor OCM through a resistance R02 and a diode D03. Consequently, as in the DCM circuit of the called position, the conductor M is grounded, the thyristor THOO triggers and feeds the conductor OCM, applying the ground to this latter for signalling the occuapancy condition.

Figure 10:
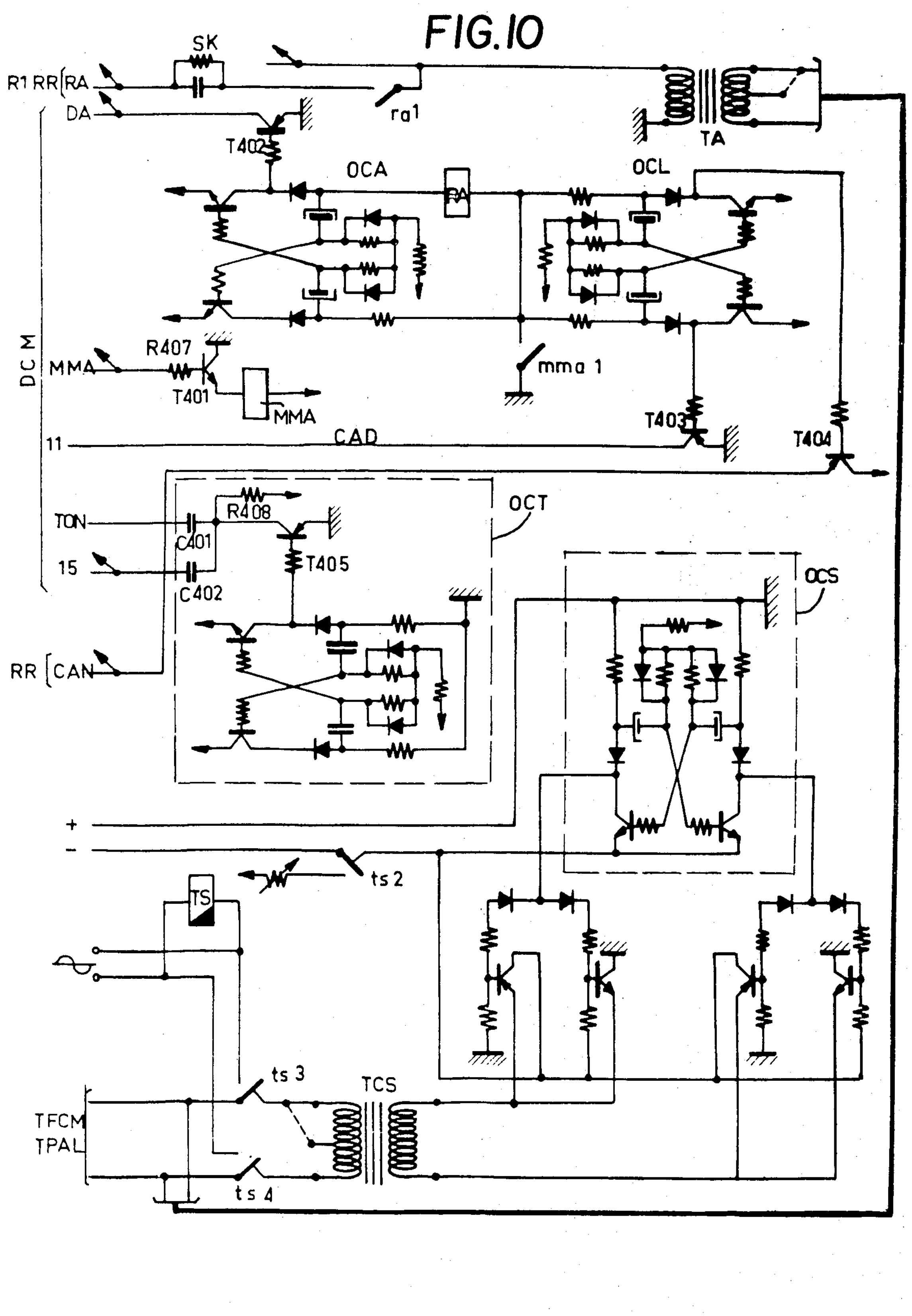
FIG. 10 shows the circuits generating periodical signals used in the said equipment.

The relay CA is connected to the emitter of a transistor T01 the collector of which is connected to the battery and the base of which is connected through a diode D01 to the battery through a resistance R01 and to a conductor DA from the common signal generator COM, FIG. 10. the conductor DA is connected to a generator OCA and consequently, the relay CA is urged provided the conductor DA is in a phase suitable for permitting the start of the call. Consequently further, and through the transistor T01, the realy CA beats at the rythm imposed by the said OCA generator.

The relay CA controls a work contact cal connected between the conductor CN and an A.C. source in series with a resistance R033. Conseuqently, each time cal closes, the A.C. sent to CN actuates the vibrating device VIB in the called position. Said current then produces the generation of a sound signal signalling the call to the user of said called position.

Further the ground which is applied to the conductor OCM is transmitted to the occupancy marker device MO, FIG. 9, and ensures the lighting in each position of the lamp LAP corresponding to the called position so that said condition is known throughout the positions in the equipment.

In the DCM circuit of the calling position, the resistance R022, FIG. 7, connected to the battery and to the conductor OA is used for triggering the thyristor TH5 of the corresponding BSA circuit. As soon as the thyristor TH5 is conducting, it grounds the emitter of the transistor T5 through a diode D16. As the conductor C is connected to the battery through the hook contact and the dial of the set, the transistor T5 grounds the conductor 6 through a diode D21. In the RI circuit of the concerned CCI circuit, FIG. 5, the conductor 6 is connected to the battery through a resistance R218 and to the base of a transistor T203 through a resistance R207. The base of the transistor T203 is connected to the collector of a transistor 204 the emitter of which is connected to the battery and the base to the conductor 3 through a resistance R208. Consequently the ground on the conductor 6 unblocks the transistor T203 but, on the other hand, as long as the conductor 3 is grounded, the transistor T204 keeps the transistor T203 in its blocked condition. The conductor 3 is connected to the battery through a diode D208 and a condenser C203. The connection point between these elements is connected through a resistance 206 and a diode D204 to the trigger electrode of a thyristor TH2 1 the cathode of which is connected to the collector of the transistor T203 and the anode of which is connected to the conductor 1 through a resistance R205 and a diode D206. Consequently, as soon as the conductor 3 is ungrounded, the transistor T203 triggers to its conductive condition and enables the discharge of the condenser C203 through the trigger input of TH201. This thyristor then feeds the following circuit: from the ground through contact sa2 in its rest condition, conductor 1, diode D206, resistance R205, thyristor TH201, transistor T203 to the battery. The anode of TH201 is connected through a diode D203 and a resistance R203 to the base of a transistor T201 the emitter of which is grounded and the collector of which is connected to the coils of two relays SA and SB and to the connection points between the diodes D209, D211 and D212. Consequently, as the thyristor TH201 is triggered, the battery is applied to the base of the transistor T201 which becomes conductive consequently grounding the relay coils SA and SB and also the base of the transistors T206 and T207. The ground on the base of T206 blocks it and removes the battery on the conductor 4 from the transistor Tc. Further, the ground on the base of T207 renders it conductive and clears the availability circuit chain through the conductor C1 so that the battery of the transistor Tc can be applied to the next CCI circuit of the arrangement. Diode D212 reinforces the application of the ground to the conductor 4 of the occupied CCI circuit.

In the DCM circuit of the calling position, as the conductor P is connected to the conductor G2 by a diode D024, the battery existing on P is transferred to G2 which, in the call marker MA, FIG. 8, is connected to the base of a transistor Tg through a resistance R303, said base being connected to the ground through another resistor R304. The emitter of Tg is grounded and the collector is connected to a conductor G1. As the battery is applied to G2, the said transistor is conducting and the conductor G1 is grounded. In the DCM circuit, G1 is connected to the base of a transistor T51 through a resistance R204, a Zener diode Z01, a diode D031 and a resistance R032. The junction point between R024 and the Zener diode is connected to the conductor P through a diode D029. Consequently, the ground existing on G1 unblocks the transistors T51 in all DCM circuits except in the DCM circuit of the calling position wherein the diode D029 applies a negative polarity to the Zener diode Z01 as the battery is applied to the corresponding conductor P.

Each DCM circuit includes a relay CAA connected between ground and, on a first part, the collector of a transistor T51 through a diode D030 and, on a second part, the collector of a transistor T52 through a further diode D026, the emitters of both transistors being connected to the battery. Consequently, in all DCM circuits other than the calling position DCM circuit, the relays CCA are actuated to work after the transistors T51 are unblocked.

In the DCM circuit of the calling position, the conductor OA is connected through a diode D023 and a resistance R025 to the base of the transistor T52. Consequently, as soon as the thyristor TH5 of the BSA circuit of the calling position, FIG. 6, is made conducting, the conductor OA grounds the base of the transistor T52 through a diode D023 and the resistance R025 which makes this transistor conductive and consequently, through it, the relay CAA is actuated. The relay CAA controls two contacts cca1 and cca2 respectively connected through their rest conditions, across the conductors L1, L2 and the conductors EM1, EM2. Consequently further, the actuation of the relay CCA produces an opening of the cca1 and cca2 contact, cutting off L1, L2 from EM1, EM2.

Relay CAA also controls a rest contact *cca3* connected between the battery and the collectors of two transistors T53 and T54. The opening of cca3 cuts the battery from said collectors so that the battery is removed from the conductor P and the conductor G2, which suppresses the ground to the conductor G1. All the relays CAA which were actuated during the passage of the control through the DCM circuits of all positions, except the one of the calling position, come back to rest, consequently enabling the passage of a further control from another position, towards the call marker device MA.

In the DCM circuit, the conductor OA is connected through a diode D016 and a resistance R018 to the base of a transistor T501 and through a diode D017 and a resistance R019 to the base of a transistor T502. The emitter of T501 is connected to a work terminal of the cca1 contact whereas its collector is connected to ground through a resistance R021. The collector of T502 is connected to the work terminal of the cca2 contact through a diode D018 whereas its emitter is connected to the battery. The collector of T501 is further connected to the conductor D and also to the battery through a condenser C02. Consequently, at the release of the TAP key which has been actuated in the calling position, the loop of the conductors L1, L2 is closed and the following circuit is established: from battery through T502, D018, cca2 in its work condition, conductor L2, loop of the position, conductor L1, cca1 in its work condition, T501 to the conductor D. A battery is consequently applied to the conductor D. In the BSA circuit, said conductor D is connected to the base of a transistor T1 through a diode D7 and a resistance R7, said base being connected to the trigger electrode of thyristor TH5 through a condenser C4. The emitter of T1 is connected to the cathode of TH5 and its collector is connected through a resistance R4 and a diode D3 to the trigger electrode of a thyristor TH3, said electrode being connected to the cathode of said thyristor through a resistance R3. The collector of T1 is also connected through a resistance R5 and a diode D4 to the trigger electrode of a thyristor TH4, said electrode being connected to the cathode of TH4 through a resistance R6. The cathode and the anode of TH3 are respectively connected to the conductors B and L2 and the cathode of the tyristor TH4 is connected to the conductor O, to the conductor OC through a diode D9 and to the conductor 15 through a diode D25. The anode of TH4 is connected to the conductor 2. Consequently, the battery existing on D triggers the transistor T1 to conduction so that the ground on the conductor 1 is transferred through TH5 and T1 to the trigger electrodes of the TH3 and TH4 thyristors, consequently unblocking them.

Condenser C1 is connected through a resistance R1 and a diode D1 to the trigger electrode of a thyristor TH1 the anode of which is connected to the conductor A and the cathode to the conductor L1. Condenser C1 was charged when the battery was applied to P and now discharges when the key is released, through the trigger electrode of TH1 and the position loop, so that the position is supplied through the following circuit; from the ground through T201, FIG. 5, relay SA, conductor A, TH1, FIG. 6, conductor L1, position loop, conductor L2, TH3, conductor B, relay SA, D202, T202 to the battery. The conductor 1 is grounded and connected to the base of T202 through the resistance R209 and the emitter of T202 is connected to the battery, its collector being connected to the conductor B through the diode D202. The relay SA connected to the A and B conductors is consequently actuated. It controls the transfer of its contact sa2 which consequently grounds the conductor 2 which is connected to the battery through a resistance R214 and to the anode of the thyristor TH4. As the cathode of TH4 is connected to the conductor OC, the thyristor TH4 feeds OC.

The cathode of TH4 is also connected through a diode D12 to the junction point between a resistance R8 which is connected to the battery and a condenser C3 connected to the emitter of T1. Consequently, the ground existing on the cathode of TH4 reverses the polarity across C3 consequently blocking the thyristor TH5.

In the DCM circuit, the conductor OC, FIG. 7, is connected to the conductor OCM through a diode D02. Consequently the ground existing on conductor OC is transferred through the diode D02 to the conductor OCM for signalling the occupancy of the calling position by lighting the corresponding lamp LAP at all the other postions.

The conductor OC is connected to the junction point between a battery-connected resistance R043 and a diode D022 connected through a resistance R025 to the base of the transistor T52. Consequently the ground on OC is applied to the base of T52 for keeping the relay CCA actuated in the DCM circuit of the calling position.

Figure 5:
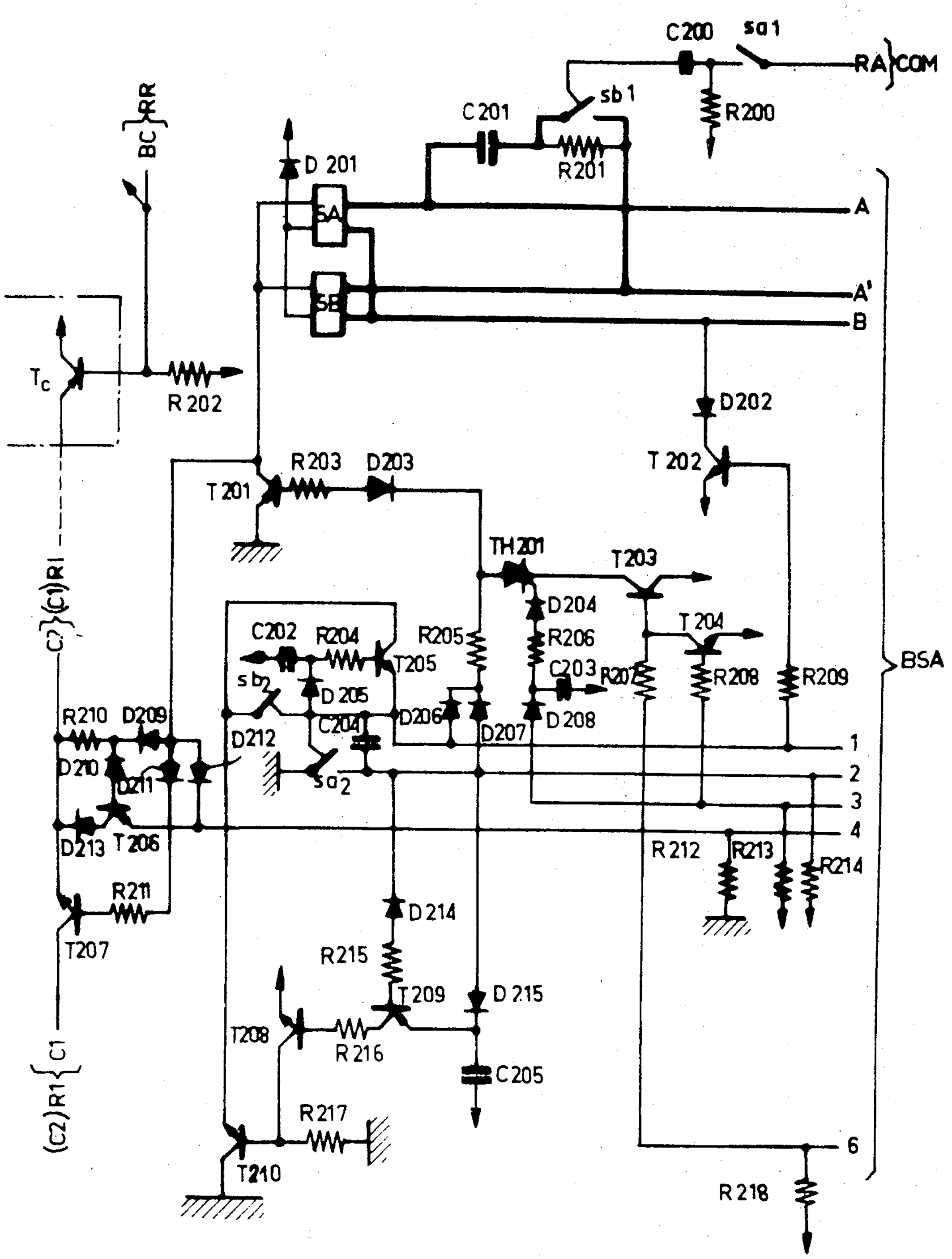
FIG. 5 shows the circuitry of a local relay means in an internal connection network of the equipment.

In the RI circuit, FIG. 5, the conductor RA which is fed with alternating current from a call current transformer TA in COM, FIG. 10, is connected to a work contact *sal* of the relay SA, said contact being connected to the battery through a resistance R200 and, through a condenser C200, to the rest terminal of a contact *sbl* of a relay SB connected to the conductors A' and B. The work terminal of *sbl* is connected to A' and a resistance R201 is connected between the moving blade and the work terminal of said contact. Said moving blade is further connected through a condenser C201 to the conductor A and to the relay SA. Consequently the caller receives a ring back through the following circuit; TA, FIG. 10, conductor RA, contact sal when closed, C200, contact sbl in rest position, C201, conductor A, conductor L2, position loop, conductor B, relay SA, D201 to the battery.

When the called position answers, all operations are similar to the ones concerned with the release of the calling key by the caller. In this respect, the relay CCA of the DCM circuit of the called position is maintained actuated, the contacts ccal and *cca2* are brought to their work conditions and the battery is applied to the conductor D through the transistors T501 and T502 and the loop of the position. The application of the battery to the conductor D unblocks of the transistor T1, which triggers of the thyristor TH3 in the BSA circuit of the called position. The condenser C2 is connected through a resistance R2 and a diode D2 to the trigger electrode of the thyristor TH2 the anode of which is connected to the conductor A' and the cathode to the conductor L1. Condenser C2, previously charged through T3, then discharges through the trigger of TH2 and the position loop. The new supply circuit is: from the ground through T201, relay SB, conductor A', thyristor TH2, conductor L1, position loop, conductor L2, thyristor TH3, conductor B, relay SB, D201 to the battery.

The relay SB is actuated and short-circuits the resistance R201 from its contact sb1. Said resistance R201 is the one which maintained the thyristor TH1 when the called person unhooked his handset. When the relay SB conductors A and A' are connected through C201 which, together with the relays SA and SB, constitute a supply bridge to a common point. Contact *sb2* opens and cuts the ground which was applied by the transistor T210 on the conductor 1. Consequently the thyristor TH5 is reset and cuts through OA the supply of the thyristor TH00, FIG. 7 which releases the relay CA and the ring current ceases. The thyristor TH201 is only maintained in its conductive condition from the ground on the conductor 2 as said conductor is connected to the anode of the thyristor through a diode D207 and a resistance R205. T202 is no longer biassed and the battery is disconnected from the conductor B.

When, after the communication is over, both handsets are placed on their hooks, the circuit is cleared.

b. the called position does not answer:

When the called position is slow to answer, the calling position may either place his handset back on the hooks or press another one of the TAP keys. When he presses on a TAP key, the loop between L1 and L2 is cut, the relay SA returns to rest which ungrounds the conductor 2 and consequently cuts off the thyristor TH4 of the BSA circuit of the calling position.

In the corresponding RI circuit, FIG. 5, the conductor 2 is connected to the battery through a diode D215 and a condenser C205 which are serially connected. The junction point between said elements is connected to the emitter of a transistor T209 the base of which is connected to the conductor 2 through a resistance R215 and a diode D214 and the collector of which is connected through a resistance R216 to the base of a transistor T208. The emitter of said transistor is connected to the battery and its collector is connected to the base of the transistor T210 and to the ground through a resistance R217. Consequently as long as the conductor 2 is connected to ground, the transistor T209 is blocked and the condenser C205 charged through the diode D215. When the conductor is grounded 2, the condenser C205 discharges through the unblocked transistor T209 in the base of the transistor T208 which connects the battery to the base of transistor T210, consequently ungrounding the conductor 1, which in turn shut off the thyristors TH5 and TH00 of the called position. Since the thyristor TH00 is shut off, the conductor OCM is no longer grounded and, the position is cleared.

In the DCM circuit of the calling position, the cut-off of the thyristor TH4 removes the ground from the conductor OC and the relay CCA which was maintained to work from the ground on the base of the transistor T52 returns to rest. A next control is sent from the TAP key which produced the return to rest of the relay CCA and the operation is the same as explained for the above described switching operation.

c. the called position is occupied:

When the called position is occupied and, the default the corresponding signalling lamp LAP allotted to the said called position at the calling position is not lighted, ground is nevertheless applied by the marker device to the conductor MA. In the DCM circuit, the conductors OC and OA are connected, through the respective diodes D012 and D013, to a resistance R014 connected to the base of a transistor T04. The emitter of said transistor is connected to the battery and so is its base through a condenser C01 and a resistance R015 which are connected in parallel. The collector of T04 is connected through a diode D015 and a resistance R016 to the base of a transistor T05 the emitter of which is connected to the conductor MA and the collector of which is connected through a diode D*b l to the conductor BO.*

Consequently, when the called position is actually occupied, a ground is applied to the conductor OA or the conductor OC, which unblocks T04 and also T05. The transistor T05 transfers the ground on MA to the conductor BO through the diode D*b*.

In the DCM circuit, the collector of the transistor T05 is also connected to the emitter of a transistor T55 the base of which is connected through a resistance R020 and a diode D020 to the conductor P. The collector of the transistor T55 is connected through a diode D*o*21 to a condenser C03 connected to the battery and also through a diodoe D025 and a resistance R025 to the base of T52. Consequently, in the DCM circuit of the calling position, the battery existing on the conductor P unblocks T55 which charges the condenser C03 from the ground existing on the collector of T05 and immediately unblocks the transistor T52 which in turn actuates the relay CCA and avoids a blocking of the equipment. The condenser C03 thereafter discharges through T52 by maintaining CCA actuated during a lapse of time greatly exceeding the time interval necessary to press the key. In this way, the call will remain without any action.

d. Direct access to the network:

When the satellite position is permitted to have access to the external telephone lines of the network and wishes to obtain such an external line, the key TOIR is pressed and the circuit is established in the call marker MA across the conductors EM2 and CM3 as the closure of the contacts *a* and *b* actuated by TOIR (FIG. 2) connects the conductors L2 and CM3. In the call marker, the relays RC6 and DC6 are actuated and the closure of the contacts *rc*6.1 and *tc*6.1 unblocks the transistor TmR the collector of which is connected to the conductor MR. Consequently said conductor MR is connected to the ground when a TOIR key is depressed. Simultaneously, as in the case of establishment of a local communication, the battery is applied to the conductor P and to the conductor G2 which, from the actuation to work of the CAA relays, isolates from the marker device MA all the DCM circuis of the positions other than the calling one, such a condition existing during the necessary time interval of establishment of the communication.

The conductor MR is connected to the terminal MR2 of the last one of the RR circuits, that is to say RRN in FIG. 1. From RRN, said conductor MR issues as MR1 which is connected to the MR2 terminal of the preceding RR circuit, and so forth up to the first one, RR1. In RR1 the terminal MR1 is connected to the terminal CR1, FIG. 4. The conductor CR1 passes through the first RR circuit and issues through the terminal CR2 which is connected to the terminal CR1 of the next RR circuit and so forth up to the last one of said circuits. Within each RR circuit, the conductor MR2 is connected through a resistance R143 to the base of a transistor T114 the collector of which is grounded and the emitter of which is connected to the conductor MR1 and to the battery through a resistance R151. Consequently, when ground is applied from the marker device MA to the conductor MR, the transistor T114 turns on and transfers to the preceding RR circuit a ground which is applied to the collector of the transistor T114 of said RR circuit, and so forth up to the first RR circuit and thereafter from the conductor MR1 to the conductor CR1. The conductor CR1 is connected to the moving blade of a contact *or*2 which, in its rest condition, is serially connected to two further rest contacts *ar*3 and *ap*3, serially connected through diodes D137 and D138 to the conductor 3. The work terminals of said three contacts are united on the conductor CR2. Consequently, when the three relays OR, AR and AP of the first RR circuit are in their rest condition, the ground is routed to the conductor 3 of said RR circuit. When one of the said three relays is in its work condition, the ground is routed to the chain circuit CR2, CR1 towards the first RR circuit which is in a cleared condition.

In the RR circuit which has been so selected, the condenser C112 charges through the serially connected diodes D137 and D138. The conductor 3 is connected ahead of diode D137, to the base of a transistor T110 through a diode D126 and a resistance R118. Said transistor T110 is consequently unblocked during the complete time interval of the control. The emitter of the transistor T110 is connected to the battery whereas its collector is connected to the junction point between a diode D125, which is serially connected with a diode D114 connected to the base of the transistor T103, and a resistance R127 connected to the conductor 6. The junction point between the diodes D114 and D125 is connected to the battery through a resistance R117 and a condenser C115. Consequently as long as the transistor T110 is in its conductive condition, it maintains the transistor T103 in a blocked condition and impedes the triggering of the thyristor TH101.

As soon as the ground is removed from the conductor 3, the transistor T110, now blocked, causes a free biasing of the transistor T103 from the conductor 6. The condenser C112 then to discharges through the trigger electrode of TH101 and an occupancy circuit will be created through this thyristor. Said circuit includes a transistor T147 the collector of which is to ground and the base is connected to ground through a diode D109 and a resistance R113, the junction point of which is connected through a condenser C120 to the moving blade of a contact ar1 connected to the battery in its rest condition and connected to ground through a resistance R103 in its work condition. The emitter of the transistor T147 is connected to D120 through the rest contact br2 and a parallel condenser C117. A work contact *da*5 is also connected in parallel relation to the diode D120 and the contact *ar*2. Consequently, the above mentioned occupancy circuit is as follows: from ground, through T147, contact *br*2 in rest condition, D120, contact ar2 in rest condition, D121, relay coil OR, TH101, T103 to the battery.

The relay OR becomes actuated and, from its contact *or*2 in work position, it produces the routing of the chain CR1, CR2 to the following RR circuits. However, prior to the transfer, the ground existing on the conductor 3 triggers the thyristor TH5 in the BPR circuit of the calling position, through transistor T2 as the battery is applied to the conductor P. When a connection is not established between the terminals X1 and X2 the corresponding satellite position is not permitted to have direct access to the network lines: if so, transistor T2 will not have been in conductive condition and thyristor TH5 will not have been triggered.

As soon as the thyristor TH5 conducts, the ground is applied to the conductor which applies a bias to the transistor T52 through the diode D023 and the resistance R025. The relay CCA of the concerned DCM circuit is actuated so that the conductors L1 and L2 of the marker device MA are isolated by the contacts *cca*1 and *cca*2 of the relay CCA. The other DCM circuits are free for traffic. Further, ground is applied through the diode D16 to the emitter of the transistor T5 the base of which is connected to the battery through the conductor CN. Ground is also applied through the diode D21 to the conductor 6 for biassing the transistor T103 as it has been hereabove described. The relay OR also control two contacts *or*3, *or*4 which, in their rest condition, are connected across the network lines LR1 and LR2 and a circuit serially comprising a condenser C103, a relay CAP and a rest contact tn1. When OR is actuated, contacts *or*3 and *or*4 connect the conductors of the external line LR1 and LR2 to a self-inductance element SR.

When the calling position releases the key TOIR, the loop L1, L2 of this position is closed. As in establishment of a local communication, a battery is applied to the conductor D, which unblocks the transistor T1 which in turn triggers the thyristors TH1, TH3 and TH4. In its actuated condition, the contact or1 is connected to the emitters of the transistors T131 and T141. The base of T141 is connected through a diode D116 to the collector of T141 which is connected to the battery through a resistance R119. The base of T141 is connected through a diode D118 and a Zener diode Z103 to the ground through a resistance R113 to the conductor 1 through a diode D128 and to the collector of a transistor T140 through a resistance R109. The emitters of the two transistors T131 and T141 are also connected to the conductor 2 through a diode D127. The collector of T131 is connected through a diode D115 to a coil of the relay AR the other coil of which is connected to the battery through two series diodes D102 and D103. The two coils of AR are also respectively connected to the conductors A and B. Consequently, AR is actuated through the following circuit: from the ground through *or*1 in work condition, T131, D115, first coil of AR, conductor A, conductor L1, position loop, conductor L2, TH3, conductor B, second coil of Ar, D103, D103 to the battery.

The communication with the network line LR1, LR2 is established by a bridge formed of two conductors C101 and C102 in series in the conversation conductors between the self-inductance SR and two respective rest contacts *da*3 and *da*4 connected to the conductors A and B and the relay AR.

In the above described circuit, there is provision to eliminate the self-inductance action of the relay AR and to each the triggering of the thyristor TH3 by providing a short-circuit of the coil of the relay AR to the battery by means of a transistor T146 the collector of which is connected to the conductor B, the emitter to the battery and the base to the conductor 1 through a resistance R104, said conductor being connected to ground. As soon as the relay AR is actuated, the contact ar2 removes the ground. The conductor 1 is connected through a diode D135 to the emitter of a transistor T104 and, through a diode D136 to a condenser C107 to the battery. A resistance R114 connects the base of T104 to the junction point between the diode D136 and the condenser C107. The collector of T104 is connected to the emitter of a transistor T147. Consequency, when ar2 removes the ground, from the conductor 1, this ground is maintained through the discharge of the condenser C107 through a resistance R114 in the base of the transistor T104. In work condition, contact ar2 grounds the conductor 2 which is connected by a condenser C118 to the condenser C107. It is the ground on conductor 2 which causes the conduction of the thyristor TH4 and blocks the thyristor TH5 from the reversal of polarity on the condenser C3. The occupancy condition of the calling position is ascertained by the application of the ground to the conductor OC, said ground being transferred through the diode D02 to the conductor OCM to the occupancy marker device MO. As soon as the condenser C107 no longer biases the transistor T104, the transistor T146 is blocked and ensures restitution of the relay AR to its normal function. The relay OR is only maintained actuated from the ground on the conductor 6, applied through a diode D122.

In its work condition, the contact *or*1 is connected, through a resistance R150, *e* diode D157 and a Zener diode Z105, to the base of a transistor T118 the emitter of which is connected to the battery and the collector to the conductors 7 and LO. Consequently when the relay OR is actuated, the contact *or*1 applies a battery to the conductors 7 and LO. One of the lamps LO1 . . . LON of the operator's position, FIG. 3, corresponding to the occupied network line is lighted since the corresponding conductor LO is connected to the battery.

Each BPR circuit includes a transistor T4 the base of which is connected to the conductor 7 through a resistance R15 and a diode D22, the collector of which is connected to the conductor OIR and the emitter of which is connected to the emitter of the transistor T5 is connected to the cathode of the thyristor TH4 through a diode D18 and to the cathode of the thyristor TH5 through the diode D16. Consequently in the BPR circuit of the calling position, as the conductor 7 is connected to the battery, the transistor T4 is conducting, the transistor T4 consequently transferring the ground from the thyristor TH5 through the diode D16 during the time the key TOIR is depressed or from the thyristor TH4 through the diode D18 when said key is released. Said ground is applied to the conductor OIR and lights the lamp LOIR, FIG. 2, in the calling position, for signalling obtention of an external network line.

e. dialling:

At each return stroke of the dial the impulse contacts CNa, FIG. 2, intermittently suppresses the battery of the CN conductor. The dial could be replaced by all-electronic impulse generator with a keyboard control. As the conductor CN is connected by the diode D19 to the base of the transistor T5, said transistor does not conduct during such interruptions and ground is not applied to the conductor 6. The relay OR comes back to rest during each impulse. The thyristor TH101 however is maintained in its conductive condition from the ground of the conductor 2 which is applied to the thyristor through the diode D123 and the resistance R115 and also by the battery applied to the emitter of the transistor T103 which is maintained in its conductive condition from the discharge of the condenser C115 into its base.

The conductor 6 is connected, through two diodes D150 and D148 and a Zener diode Z014, to the base of a transistor T112 the emitter of which is connected through a resistance R126 and a diode D139 to the conductor 1. The junction point between the diodes D148 and D150 is connected to the battery through a resistance R147. The collector of T112 is connected to the battery through a condenser C109 and to the base of a transistor T111 through a resistance R124. The collector of T111 is connected to the ground and its emitter is connected to a relay TN. Consequently, as long as the conductor 6 is grounded, the transistor T112 is unblocked. The suppression of this ground unblocks the transistor t112 and the charge of the condenser C109 which unblocks the transistor T111, and consequently the relay TN is actuated to work. Said relay controls a work contact *tn*2 connected across the conductors LR1, LR2 above *or*3 and under *or*4. The closure of *tn*2 short-circuits the line and the contact or4 opens at the rythm of the dialling impulses. Each new application of the ground to the conductor 6, the transistor T112 is blocked but the condenser C109 ensures the transistor T11 remains in its conductive condition, which enables the relay TN to remain actuated during the overall length of a train of impulses. Said relay TN comes back to rest at the termination of each one of such impulse trains. The rest contact *tn*1 is serially connected with the relay coil CAP and, when opened, cuts off the call reception circuit.

The cut off push-button BCO, FIG. 2, controlling the rest contact BOCa, releases the relay OR in the same fashion as the impulse control springs of the dial, as long as pressure is maintained on said push-button.

f. double call:

When a satellite position is connected to an external line, and a local communication calling key is depressed for this position, the loop L1, L2 is opened. The thyristors TH2 and TH3 are blocked, the relay AR comes back to rest suppressing the ground on the conductor 2 through its contact ar2. The thyristor TH4 is cut off, occupancy is no longer indexed, the transistor T52 is no longer biased through D022 and relay CAA comes back to rest. The contacts cca1 and cca2 switch the conductors L1, L2 to the marker device MA. The rest contact *cca*3 enables re-application of the battery to the conductor P and to the conductor G2 as in the establishment of a local communication. Similarly, the ground on G1 isolates the other DCM circuits. A control is sent to the marker device which finds a ground on the conductor MA of the called position.

When the relay AR drops out, the conductor 6 is temporarily ungrounded but, as the work contact *da*5, which is closed as it will be herein under described, is connected between the contact *br*2 in rest condition and the conductor 1, a ground is applied through the diode D121 for keeping the occupancy circuit activated, transistor T103 being maintained in a conductive condition by the condenser C115 until the ground reappears on the conductor 6. In the BPR circuit, the conductor P is connected through a diode D20 and a resistance R16 to the base of a transistor T6 the collector of which is connected to the conductor 8 through a diode D23 and the emitter of which is connected to the cathode of the thyristor TH4 through a resistance R13 and a diode D17. The emitter of the transistor T6 is also connected to the conductor 5 through a diode D24 and to the battery through a condenser C5. Consequently, the battery from P applies a bias voltage to T6, simultaneously to T2 and the condenser C5, which has been charged through the diode D17 and the resistance R13, discharges through the diode D23 to the conductor 8. In the RR circuit, the conductor 8 is connected to the conductor 4 through a condenser C122, to the base of a transistor T119 through a resistance R141 and to the work terminal of a contact *ar*4 the moving blade or armature of which is connected to the battery. The collector of T119 is connected to ground and its emitter is connected to the battery through a resistance R140 and to the base of a transistor T100 through a diode D167 and a resistance R139. The collector of the transistor T100 is connected to the conductor 4 which is connected to ground through a resistance R137 and to the base of a transistor T125 through a resistance R138. The emitter of said transistor is grounded whereas the collector is connected to the conductor blocking the chain BC. Consequently, when the condenser C5 discharges on the conductor 8, the transistor T119 is biassed and unblocks the transistor T100. A battery appears on the conductor 4 of the CCR unit and, simultaneously, the battery applied to the base of the transistor T125 results in the application of ground to the conductor BC. In the RL circuit, FIG. 5, the conductor BC is connected to the base of the transistor Tc which is connected to the battery through a resistance R202. Consequently, the ground on the conductor BC blocks the transistor *Tc* and the battery is suppressed from the conductor 4 of the CCI circuits. The ground on the conductor M is solely used by the transistors T3 of the BPR circuit of the CCR circuit in which the double call operation is precluded and, as for the establishment of a local communication, the passage of T3 to its conductive condition controls the triggering of the thyristor TH5, the charge of the condenser C2 and the application of ground through the diode D14 to the conductor 3, to the emitter of the transistor T2 of the BPR circuit of the position from which the double cell is operated. In said BPR circuit, the transistor T2 is conducting, which charges the condenser C1 through the diode D6 and which triggers the thyristor TH5 through the diode D10 and the resistance R10. Said thyristor the conductor 6 through the diode D16, the transistor T5 and the diode D21. The called position is ring from the actuation of the thyristor THOO in the DCM circuit of said position.

When the key TAP is released, the conductors L1, L2 of the calling position are again looped, a battery is applied to the conductor D, the thyristors TH3 and TH4 are triggered through T1 and the thyristor TH1 is unblocked from the discharge of C1. The relay AR is reactuated so that the thyristor TH4 may deliver current and the thyristor TH5 is unblocked. The occupancy of the position is reinstated in the other positions of the equipment from the application of ground to the conductors OC and OCM.

The collector of the transistor T125 is connected through a diode D158 to the relay to which a diode D164 is shunt connected. Said DA relay is connected to the emitter of the transistor T117 the collector of which is connected to the battery and the base of which is also connected to the battery through a diode D162 and the resistance R148. A diode D154 connects the conductor 3 to a condenser C110 connected to the battery and further to the junction point between the diode D162 and the resistance R148, said junction point being further connected to the conductor 9 through a diode D163. Connsequently, when the condenser C5 discharges, the switching of the transistor T125 to its conductive state results in the transfer of the ground on the conductor BC through the diode D158 to the relay DA which is actuated to work through the transistor T117. The diode D138 inhibits the blocking of the transistor T117 during said control by the ground on the conductor 3.

The relay DA is connected through a resistance R149, through its work contact dal, to the work terminal of the contact orl. Once the condenser DA is actuated, it holds through the following circuit: from the ground through *or*1 to work, *da*1 to work, R149, coil of DA, T117, to the battery.

Said relay DA controls two contacts *da*3 and *da*4 which, when at rest, respectively connect the conductor A and the condesner C101 to the conductor LR1 and the conductor B and the condenser C102 to the conductor LR2. In work condition, contact *da*3 connects the conductors A and A' through a condenser C104 and a series resistance R101. In work condition, contact da4 connects the conductor B to the second coil of the relay BR connected to the battery. When DA becomes activated contacts *da*3 and *da*4 switch the conversation conductors of the calling position on the double call conversation circuit, conductors A, A' and B of the concerned CCR circuit. The junction point between the resistance R149 and the contact dal which is closed at this time instant and connected to the ground, is connected through a resistance R120 and a diode D119, to the base of a transistor T150, the resistance R120 being also connected to the battery through a resistance R121. The collector of the transistor T150 is connected through a diode D129 to the conductor RA whereas its emitter is connected to the battery through a resistance R108 and a diode D166 and further, to the rest terminal of a contact br4 the moving blade of which is connected to the junction point between the condenser C104 and the resistance R101 and the work terminal of which is connected to the conductor A'. Consequently, as the transistor T150 is presently unblocked from the ground to its base, a return call signal existing on the conductor RA connected in the common equipment COM, FIG. 10, to the call transformer TA, is sent to the calling position through the contact *br*4 in its rest condition. The emitter of the transistor T150 is connected to a terminal P which may be connected to the terminal O connected to the line LR1. Similarly the rest terminal of the contact *br*3 is connected to a terminal N which may be interconnected with a terminal M connected to the line LR2. Consequently, when connections are made between the terminals M, N and the terminals O, P, the return call signal is sent to the external telephone line and the communication will only be broken when relay BR operater on unhooking operation of the local called person.

The junction point between the resistance R149 and the contact dal, when closed, is further connected through a condenser C100 and a rest contact brl in parallel connection, in series with a diode D108 and a resistance R105, to the base of a transistor T134 the emitter of which is connected to the battery and the collector of which is connected to the conductor B. Consequently the ground is applied to the base of a transistor T134 and unblocks said transistor and the application of the battery to the conductor B for easing the triggering of the thyristor TH3 in the BPR circuit of the called position, cancelling the selfinductance action of the relay coil.

The relay DA controls a further work contact da2 which is serially connected with a diode D159 between the junction point between the resistance R150 and the diode D157 and the junction point between a diode D165 connected to the conductor CAN and the emitter of a transistor T107. The conductor CAN is connected to the generator OCL, FIG. 10, for intermittent application of a battery on said conductor at the rhythm of operation of said generator OCL. Said intermittent battery is thus applied through the diode D159 and the contact *da*2, the diode D157 and the Zener diode Z105 to the base of the transistor T118 which consequently blocks and unblocks. The conductors LO and OIR are consequently fed with intermittent current through the conductor 7 and the transistors T4 of the BPR circuits of the two concerned positions, so that the lamp LO of the operator's position and both lamps LOIR of the concerned positions are intermittently lighted to the said rhythm of the battery supply.

When the called position unhooks his handset, the operation of the BPR circuit is exactly the same as described for a private or local communication establishment in the corresponding BSA circuit. The thyristors TH2 and TH3 switch the conductors L1 and L2 to the conductors A' and B of the CCR circuit. As a work contact *da*6 of DA which is serially connected to the conductor A' is closed at that time instant, relay BR is actuated, the condenser C100 delays the action of the rest contact brl which opens and finally the contacts *br*3 and *br*4 in work condition, cut off the call return circuit and the communication of the calling position with the external line, provided the connections MN and OP are made. Once the condenser C100 discharged, the transistor T134 is blocked and the battery removed from the conductor B.

It may be noted that the direct access does not involve the CCI circuits and that a double call operation is independant from the local switching operations which cannot interfere therewith. Conversation is the same in double call as in local.

g. the position does not answer to double call operation:

When the called position does not immediately answer the calling position may use one of two possibilities:

1. The calling party may press another push-button TAP which de-activates the relay AR by the opening of the loop conductors L1, L2. The condenser C120 which was up to this time instant connected to ground through the work contact ar1 and the resistance R103, is now connected to the battery through the rest position of said contact. Said condenser charges which blocks the transistor T147 which cuts off the ground through the contact da5 to work on the conductor 1. The thyristor TH5 of the BPR circuit of the called position cuts off, stopping the call from the thyristor THOO. The operation is now as when the first key TAP was depressed and another position of the equipment is called and obtained.
2. The calling party may press on TOIR, which leads to exactly the same consequences but however, reinstates the communication with the external line.

Figure 4:
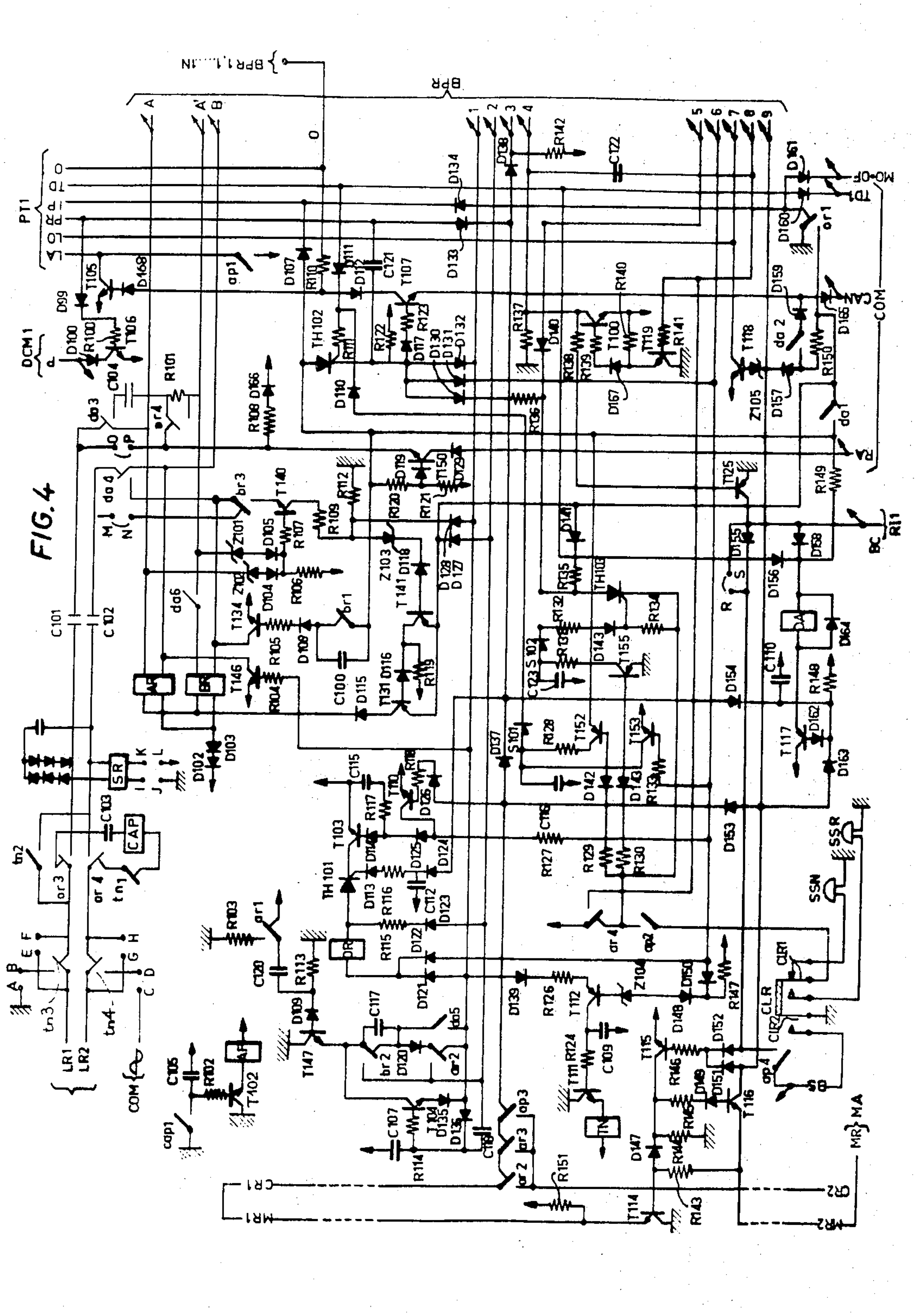
FIG. 4 shows the circuitry of an external communication relay circuit in a external lines connecting circuit of the equipment.

In the RR circuit, FIG. 4, the conductor MR2 is connected to the emitter of a transistor T116 the base of which is connected through a diode D149 and a resistance Rm45 to the junction point between the collector of a transistor T115, a grounded resistance R144 and a diode D147 connected to the base of a transistor 114. The collector of the transistor T116 is connected to the conductor 9 and to a diode D151 which is connected through a resistance R146 to the base of the transistor T115 the emitter of which is connected to the battery. The resistance R146 is further connected through a diode D152, to the work contact *ap*4 and, through a diode D155, to the collector of T125. Said transistor being unblocked connects the base of the transistor T115 to ground consequently unblocking it and consequently the transistor T116, whereas the transistor T114 is blocked for cutting off the chain MR1, MR2. With such a condition, when the ground existing on MR from the call marker device MA, from the depression of the key TOIR, is connected to the conductor MR2 of the CCR circuit on which the position operates the re-connection to the network line, said ground is absorbed by the then unblocked transistor T116. Through T116, the ground is applied to the conductor 9 and the diodes D163 and D162 which transmit it to the base of a transistor T117 which is then blocked. The relay DA is returned to rest and the return of the contacts da3 and da4 in their rest condition reconnects the conductors A and B to the conductors LR1 and LR2 of the external line. Further, the permanent opening of the contact *da*2 produces a permanent unblocking of the transistor T118 and consequently the lamps LO and LOIR are permanently lighted. Simultaneously the ground on the conductor 9 is transferred through the diode D153 to the conductor 3 and the series of triggering actions operate as when said ground was received by the chain of circuits CR1, CR2.

h. Transfer of a communication:

When a called position wishes to establish the switching of an external line to the position, the key TOIR is depressed. The potential of the conductor A' which was at an intermediate value, balanced between the two coils of 350 ohms of the relay BR, turns to ground potential. The conductor A' is connected through a Zener diode Z101, a diode D105 and a resistance R107 tothe base of a transistor T140. The junction point between the diode D105 and the resistance R107 is connected to the battery through a resistance R106 and to the conductor A through a diode D104 and a Zener diode Z102. Consequently, when the conductor A' comes to ground potential, the Zener diode Z101 biasses the transistor T140 which, through Z103 and D118, applies a "minus" potential on the base of the transistor T141. This transistor is then unblocked and applies the ground from the contact or1 in work condition to the base of the transistor T131 which is consequently blocked and controls the rest of the relays AR and BR to their rest conditions The contacts *ar*2 and *br*2, which came to rest, suppresses the ground from the conductor 2, consequently cutting off the thyristor TH4 and causing the relay CCA to fall back to its rest condition. A new control is sent towards the marker device MA, as signalled by application of ground to the conductor MR. A battery is applied to the conductor P. Simultaneously, the condenser C5 discharges through the transistor T6 the base of which is biassed from P, so that the ground is applied to the conductor 8, which ground unblocks the transistors T119, T100 and T125. The unblocked condition of T125 unblocks the transistor T115 and consequently the transistor T116 and the blocking of the transistor T114. The ground on MR2 is applied through T116 for blocking T117 so that the relay DA falls back to rest. The diode D153 also connects the ground to the conductor 3 and the switching operations are now such as previously described for the etasblishment of a direct access communication with the network.

The transistor T131, when blocked, produces the return to rest of the relay AR, the liberation of the thyristors TH1 and TH3 of the position which has managed such a double call operation. The lamps LO and LOIR are again lighted in a permanent condition. The lamp LOIR has been cut in the said position and this position can, when required, immediately produce a new call.

j. when the transfer is refused:

When the position to which the call ought to be transferred refuses this transfer, three distinct cases must be considered:

1. the calling party re-depresses his LOIR key; As in the case of an actual transfer. In the refusal condition however, the transistor T140 is unblocked from the ground applied to the conductor A, through the Zener diode Z102, the diode D104 and the resistance R107. The transistor T131 is consequently blocked. Thereafter, the calling party reinstates the communication with the network external line.

2. the calling party presses upon another TAP key. The transistor T131 is then blocked. A new double call control is sent.

3. the called party quickly resets his handset on the hook. The transistor T131 is blocked as above desccibed and the relays AR and BR fall back to their rest conditions. A transistor T152 the base of which is connected through a diode D142, a resistance R129 and the contact ar4 in rest condition to the battery has its emitter connected to the junction point between the resistance R149 and the closed work contact da1 so that said emitter is connected to the ground. The collector of T152 is connected through a resistance R128 to the battery through a condenser C116 and to the trigger electrode of a thyristor TH102 through a Shockley diode S101, a diode D110 and a resistance R111. Said R111 resistance is also connected to the conductor TD through a diode D111. The cathode of the thyristor TH102 is connected to the battery through a resistance R122 and to the conductor PR through a condenser C121. The anode of the thyristor is connected to the conductor IP through a diode D107 and also to the junction point between a resistance R149 and the contact da1. Consequently, as the emitter of T152 is grounded through the contact da1 when closed, from the discharge of the condenser C5 on the conductor 8 which unblocked the transistor T125 through the transistors T119 and T100, and as its base is connected to the battery through the contact ar4 in rest condition, said transistor T152 is unblocked and applies the ground from or1 through R128, to the condenser C116 which charges. During this charge, the voltage across the Shockley diode S101 progressively increases and said diode switches at about 20 volts and then triggers the thyristor TH102. The line then returns to the operator's position as a keep signalling condition, as it will be herein below described for placing an external line into a keep condition at the said operator's position of the equipment.

j. transfer to an occupied position:

When the position to which it is desired to transfer a communication is occupied and when, accidentally, the lamp LAP of the corresponding key is not lighted, the ground from MA on the conductor MA will not have any action in the BPR circuit of said position. No ground is applied to the conductor 3, the thyristor TH5 of the calling position is not triggerred, the relay DA becomes actuated by the discharge of the condenser C5. The conditions being such as immediately above, the line is routed to the operator's position for keep.

k. transfer to a monitored access position:

When such a position has answered to a double call process, this position may obtain the transfer of the external communication by depressing his TOIR key. The process is the same as for a direct access position except for the unblocking of the transistor T2 which is controlled from the conductor 9 through the connection between the terminals X1 and X3 of FIG. 6, instead of being ensured through the conductor 3 through the former connection between said terminals.

1. Operations from the operator's position:
a. reception of an external call: The A.C. call signal is applied to the conductors LR1 and LR2 of a network line and is received on a network line relay RR. Through the rest contacts *or*3 and *or*4 of the relay OR, the rest contact *tn*1 and the condenser C103, said signal is applied to the vibrating relay CAP. Said relay closes a work contact capl serially connected with a resistance between ground and the base of a transistor T102 the collector of which is grounded and the emitter connected to a relay AP. The junction point between capl and the resistance R102 is connected to the battery through a condenser C105 which keeps the relay AP actuated during the time intervals between two calling signals. Said AP relay controls the closure of a work contact *ap*2 serially connected with the rest contact *ar*4 connected to the battery and to the moving armature of a contact CLR1 which is a key-actuated contact. When said key is not depressed, said contact CLR1 in its rest condition connects a normal ringing generator SSN whereas, when said key is depressed, said contact switches on a restricted service ringing current generator SSR. All the contacts *ap*2 of the relays in the RR circuits are connected to the same contact CLR1. Consequently, on the reception of a calling signal on the line LR1, LR2, the ringing generator is activated and the sound is preserved between the intervals of two external call signals by means of the condenser C105.

The actuation of the relay AP further controls the closure of a work contact ap1 which is serially connected from the battery to the conductor LA (LA1 for instance when the call occurs on the first line of the external network connected to the equipment) which is connected to the green lamp LA1 of the operator's position PT1, consequently signalling the existence of an external call to the equipment.

Finally, said relay AP controls a contact *ap*3 which is serially connected with the contacts *or*2, *ar*3, in their rest condition, of the availability controlling chain CR1, CR2 for routing of the said chain to the next RR circuits.

b. answer to an external call:

For answering an external call signalled by the ringing sound signal and by the lighting of the green lamp LA, the operator presses the TPR key of PT1 corresponding to the light LA which has been lighted. The closure of the contact *b*, FIG. 3, controlled by said key closes a connection between the access interdiction conductor IP and the access accepting conductor PR. The conductor IP is connected through a diode D134 to the rest terminal of the contact or1 of the relay OR, the moving armature of which is grounded. The conductor PR is connected to the conductor 3 through a diode D133. Said conductor 3 may be considered as having two sections, one internal to the RR circuits and an external section multipled on the blocks BPR. Ground is consequently applied to the conductor 3 through the diode D138 for routing the ground to all the BPR circuits.

Said ground on the conductor 3 charges the condenser C112 through the diode D124. The conductor PR is connected through a diode D99 and a resistance R100 to the base of the transistor T106 the emitter of which is connected to the battery and the collector to the conductor PS through a diode D100. Consequently, T106 is unblocked and applies the battery to the conductor PS of the operator's position, which is multipled on all the RR circuits through the diode D100.

In the BPR circuit of the operator's position, the transistor T2 is unblocked as the conductors 3 and P are connected respectively to the ground and the battery. The thyristor TH5 is triggerred and applies ground to the conductor 6 through the diode D16, the transistor T103 and the diode D21. Said ground applied to the base of the transistor T103 through the resistance R127 and the diodes D125 and D114, unblocks said transistor so that the condenser C112 discharges into the trigger electrode of the thyristor TH101 and triggers the thyristor. The relay OR is actuated and its contact or1 removes the ground from the conductor IP, suppressing the ground from the conductor 3. The contact or2 then routes the chain CR1, CR2 to the next RR circuits, whereas the contacts or3 and or4 connect the external line LR1, LR2 to the self-inductance SR and cut off the call reception circuit.

When the key PR is released, the conductors L1, L2 of the operator's position are again looped and the same switching process as for a satellite position occurs. Between the BPR circuit of the operator's position and the RR circuit is provided a conductor 0 which is connected in the RR circuit to a resistance R110 which is connected to the collector of a transistor T107 through a diode D112 and to the base of a transistor T105 through a diode D168. The emitter of said transistor is connected to the battery and its collector to the conductor LA. In the BPR circuit of the operator's position, the conductor O is connected to the junction point between the cathode of the thyristor TH4, the resistance R6 and the diode D9. Consequently, when TH5 supplies the BPR circuit, said conductor O applies through the resistance R110, a bias voltage to the base of the transistor T105 for unblocking said transistor and preserving the application of the battery to the conductor LA. The contact or1 in its work condition unblocks the transistor T118 through the diode Zener Z 105. The battery is consequently applied to the conductor LO so that in the operator's position, the lamps LO and LA are steadily lighted, for signalling that the connection with the calling external line is actually made.

c. occupation of an external line: The operator depresses the TPR key corresponding to the required extenal network line. The operations are as described in the preceding paragraph.

d. placing a call into keep:

When the operator wishes to keep an external network line, he (she) presses the delayed transfer key TTD corresponding to said line. The thyristor TH102 is triggerred in the following circuit: from the ground on conductor 2, through thyristor TH4, conductor O, closed contact *a* from the key, FIG. 3, conductor TD, D111, R111, trigger electrode of TH102, R122 to the battery.

Simultaneously, as the relay DA is connected through a diode D156 to the conductor TD, said relay is actuated through the transistor T117 which is in an unblocked condition. The relay DA holds through the resistance R149, its work contact da1 and the or1 contact. The thyristor TH102 feeds the contacts or1 and da1 and the resistance R122. The cathode of said thyristor is connected to the base of the transistor T107 through a diode D117 and a resistance R123 to the conductor 1 through a diode D132, to the conductor 6 through a diode D131 and to the conductor 5 through a diode D130, a resistance R136 and a diode D140. Consequently, when the thyristor TH102 is conducting, it applies ground to the base of the transistor T107 which unblocks and connects the transistor T105 to the conductor CAN since the emitter of this transistor is connected to said conductor through a diode D165. Each time a battery is applied to said conductor, at the rhythm of the generator OCL, the transistor T105 is blocked and the battery is cut from the conductor LA. Consequently, the lamp LA of the operator's position flickers at the said rhythm.

The contact da2 is closed and connects the conductor CAN to the base of the transistor T118, also controlling the flickering of the lamp LO. The thyristor TH102 applies ground to the conductors 1 and 6 through the diodes D131 and D132. Further, as the resistance R136 is connected to the anode of a thyristor TH103 the cathode of which is connected to the rest contact ar4, the thyristor TH102 also applies ground to said anode. The anode of the thyristor TH103 is further connected through a resistance R135 and a diode D141 to the work terminal of the contact or1. The cathode of the thyristor TH103 is connected to a resistance R13, a diode D143 and a resistance R135 in series connection and the junction point between the diode D143 and the resistance R132 is connected to the trigger electrode of the thyristor. The resistance R132 is in turn connected to the battery through a Shockley diode S102 and a series connected condenser C123. The junction point between the condenser and this Shockley diode is connected through a resistance R131 to the collector of the transistor T155 the emitter of which is connected to ground and the base of which is connected through a diode D143 and a resistance R130 to the rest contact ar4. The junction point of the condenser C116 and the Shockley diode S101 is further connected to the collector of a transistor T153 the emitter of which is connected to the battery and the base of which is connected to the conductor 6 through a resistance R133.

The keep condition will be effective when, from the manipulation of another key or the resetting of the handset on the hook the loop L1, L2, opened, will control the reset to rest of the relay CCA which was maintained actuated by the thyristor TH4 through the conductor OC, after the relay AR is returned to its rest condition which removes the ground from the conductor 2. The occupancy condition of the operator's position is no longer signalled. In the BPR circuit of the position, the condenser C5 stays charged. When AR resets to rest, the closure of the contact ar4 unblocks the transistor T155 which, through the resistance R131, charges the condenser C123. The voltage across the Shockley diode S102 progressively increases and the diode swwtches at about 20 volts and triggers the thyristor TH103 through the resistance R132 and the diode D143. Said thyristor now feeds the following circuit: from ground, through the contact or1, at work position, D141, R135, TH103, contact ar4 at rest, to the battery. The thyristor TH103 thus applies the battery through the diode D140 to the conductor 5 and, in the BPR circuit, the battery discharges the condenser C5 through the diode D24.

When the operator wishes to answer another external call or operate an outcoming communication on another line, the key TPR is depressed and places the line on which the communication was established in a false manipulation condition. The relay AR resets to rest but the relay DA becomes actuated through the discharge of C5. The transistor T152, the emitter of which is grounded through the contacts *da*1 and *or*1 and the base of which is battery biassed through the contact *ar*4, is unblocked and applies ground through the resistance R128 for charging the condenser C116. During said charge the voltage progressively increases across the Shockley diode, which switches at 20 volts and triggers the thyristor TH102. The line is now in a keep signalling condition.

f. dialling:

The dialling is ensured exactly as for the satellite positions.

g. routing to a satellite position:

The double call operation is the same as on a satellite position. When the communication is accepted by the called position, said position depresses its TOIR key and the operation is the same as it has been herein above described.

h. take-up of the network:

When the called position does not answer, the operator has two possibilities: 1. another TAP key may be depressed as for a satellite position; 2. the external communication may be re-transferred to the operator's position. Such an operation differs from the direct access communication establishment in that the conductor IP is now grounded through *da*1 instead of *or*1, and the diode D107. The relay DA returns to rest by the application of ground from the conductor PR through the diodes D133, D154 and D162, to the base of the transistor T117 which is consequently blocked. When AR resets to rest, the complete following process is identical to the one explained for a satellite position.

i. take-up of the network after an answer to a double call operation:

The opening of the loop of the conductors L,L2 from actuation of the TPR key ensures, as in the preceding case, the blocking of the transistor T131, consequently the reset to rest of the relays AR and BR. The relay DA returns to its rest condition exactly as it has been described. As in the case of a keep operation, the condenser C5 of the BPR circuit of the position which answered the double call operation is discharged through the thyristor TH103 through the conductor 5.

j. routing executed to an occupied position (intervention of the operator in a communication):

When the operator's position wishes to intervene on an already established communication, either a local or an external one, in order for instance to inform the satellite position that another communication is kept on another external line, the TAP key of the already occupied position is depressed. The operation develops as for a normal routing, i.e., a transfer of a communication from one position to another one except that the conductor P of the operator's position is connected to the conductor PS, consequently to the conductor 12. Said conductor is connected in each DCM circuit to the base of a transistor T06 through a resistance R09 and a diode D040. The collector of the transistor T06 is connected through a resistance R08 and a diode D09 to the trigger electrode of a thyristor TH02 the anode of which is connected to the conductor 15 and the cathode to the battery through a resistance R012. The cathode of the thyristor TH02 is also connected to the base of a transistor T08 through a resistance R011 and a diode D011 and to the base of another transistor T07 through a resistance R010 and a diode D010. The emitter of T08 is connected to the conductor Li2 whereas its collector is connected to the conductor L2 through a condenser Ci2 whereas the emitter of the transistor T07 is connected to the conductor L1 and its collector to the conductor Li1 through a condenser Ci1. The emitter of the transistor T06 is connected through a diode Di to the collector of the transistor T05. Consequently the battery on the conductor 12 is applied to the base of all the transistors T06 of the DCM circuits. Simultaneously, the ground applied from the marker to the conductor MA reaches the emitter of T06 through the transistor T05 and the Di diode of the corresponding DCM (the DCM of the occupied position). The transistor T06 passes to its conduction condition and applies ground to the trigger electrode of the thyristor TH02 which is consequently triggerred. In the BPR circuit, FIG. 6, the cathode of the thyristor TH4 is connected through the diode D25 to the conductor OC and to the conductor 15 from the BPR1.1 to the BPR1.N circuits and which is multiplied to the DCM2 to DCM35 circuits. Consequently, as the thyristor TH4 is conducting, ground is applied to the conductor 15 and then the thyristor TH02 of the DCM circuit triggers and feeds the resistance R012. The thyristor TH02 applies a bias voltage to the two transistors T07 and T08 through the diodes D010 and D011, so that the conductors L1,L2 of the occupied position are connected through the condensers *Ci*1 and *Ci*2 to the conductors L11 and Li2 which are the conductors L1 and L2 of the operator's position. The conductor 15 may be connected to a generator OCT, FIG. 10, so that a ring current can be superposed on the conversation from the variation of the biassing voltages of the transistors T07 and T08. Such a condition will persist until the operator's position again takes up the network or until another key TAP is depressed for another satellite position. Both these manoeuvers produce the reset to rest of the relay AR which cuts the thyristor TH4 and consequently the supply of the thyristor TH02. The transistors T07 and T08 are subsequently blocked.

k. person search operation (delayed transfer):

In the DCM circuit, a thyristor TH01 is connected from its anode to the conductor 0A and from its trigger electrode and through a diode D06 and a resistance R06, to the collector of a transistor T01. The cathode of the thyristor TH01 is connected to the battery through a resistance R033 and to the conductor 11 through a diode D08, a resistance R034 and a diode D*rp*. The junction point of said diode and said resistance is connected through a resistance R035 to the anode of a thyristor TH*rp* the cathode of which is connected to the battery and the trigger electrode of which is connected to the conductor 13 (or TD1A) through a diode 207 and a resistance R036. The emitter of the transistor T01 is connected to the conductor M whereas its base is connected to the conductor 12 (or PS). Consequently when a double call process is conducted from the operator's position, the battery existing on PS unblocks the transistor T01 which connects the ground from conductor M to the trigger electrode of the thyristor TH01. Said thyristor is triggered and, as the conductor OA is connected to the cathode of the thyristor TH3 through the diode D8 in the BPR circuit of PT1, both thyristors TH01 and TH5 feed through the resistance R033.

When the called position does not immediately answer, the operator may press the delayed (differred) transfer key TTD which connects the conductors O and TD. The conductor TD is connected through a diode D160 to the conductor TD1a which consequently receives the ground. Said ground triggers the thyristor THrp which feeds in serial connection with the thyristors TH01 and TH5 through the conductor OA.

In the DCM circuit, the conductor 11 is connected through a diode D05 and a resistance R04 to the base of a transistor T02 the collector of which is connected to the anode of the thyristor THrp and the emitter to a conductor CL. Consequently the battery on the anode of TH*rp* unblocks the transistor T02 through the resistance R035, the diodes D*rp* and DOS and the resistance R04 and a battery is consequently applied to the conductor CL through the thyristor TH*rp* and the transistor T02. In the MO device, FIG. 9, the conductor CL is connected to the base of the transistor corresponding to the DCM circuit in the TM01 . . . TM035 transistors and, consequently the battery on CL blocks the said transistor and the reset to rest of the corresponding relay in the 01 . . . . . . 035 relays. The lamp LAP of said position is then cut off.

In FIG. 10 it is shown that the conductor 11 is connected to the conductor CAD connected to the output of the generator OCL. Said generator applies an intermittent ground on the conductor CAD and consequently on the conductor 11. The transistor T02 is alternatively blocked and unblocked which produces beats of the corresponding relay in the relays 01 . . . 035. The lamp LAP corresponding to the position flickers in all the positions of the equipment, consequently signalling that an external communication has received no answer from a routing from the operator's position to the satellite positions. Further, depressing of the key TTD applies the ground on TD through the diode D111 and the resistance R111 to the trigger electrode of the thyristor TH102 which is consequently triggerred. The transistor T107 is unblocked through the diode D117 and the resistance D123. Said transistor is connected to the CAN conductor. Consequently the transistor T105 is alternately blocked and unblocked and the lamp LA connected to the conductor LA flickers at the said rhythm.

l. answering a delayed transfer:

When the handset is unhooked at a position in delayed transfer condition, the relay AR is actuated and from its contact ar1 removes the ground from the conductor 1. The thyristor TH5 blocks and also the thyristor TH01. Since the conductor 11 no longer grounds the diode Drp, the thyristor Thrp blocks. Consequently the transistor T02 is no longer in its conductive condition, the conductor CL is disconnected from the ground and the corresponding relay in the relays 01 . . . 035 is permanently actuated. The lamp LAP is again lighted but in a permanent light condition.

The called position was informed from the flickering of the lamp LAP that the operator was no longer on the line. In order to establish communication with the external network, the TOIR key must be depressed. When the owner of the called position is not at his position, he may call the operator from another position and ask the operator to proceed to a further routing to another position of the call.

m. Call to the operator's position during a communication:

When this necessity occurs, the key TAP1 of the satellite position is depressed. The operative process is the same as for a double call operation but, when the operator unhooks the handset, the O conductor connects the ground from the thyristor TH4 to the base of the transistor T105 which lights the lamp LA in a steady condition whereas the lamp LO is still flickering. The operator consequently knows the line through which the call is transmitted to the operator's position. The take back of the network either by the satellite set or by the operator's set is operated as herein before described.

Restricted service operation:

When the key CLR is pushed to the "restricted service"position, the contact CLR1 is actuated so that the battery from the contact *ap*2, when AP is actuated to work condition, is sent to the restricted service ring circuit SSR. Further the key CLR actuates a further contact CLR2 which closes in the restricted service condition of CLR. CLR2 is serially connected from the ground to the conductor BS, the work contact ap4, the diode D152, the resistance R146 and the base of the transistor T115. This transistor is consequently permanently unblocked for a call occurring in the restricted service condition of the equipment. In such conditions, the satellite sets, whether having direct or indirect access to the network, are each able to answer a call signal. The process is identical to that of a network take back operation except that the transistor T115 is not unblocked from the transistor T125 during the discharge od the condenser C5 but from the ground at the CLR2 contact of the CLR key.

It may be noted that, as long as call under restricted service operation is not satisfied, any trial to obtain a direct access to the network by any position results in an answer to such a call.

Two terminals R and S are provided in derivation over the diode D155. When a connection is made between said terminals, any new local communication is prohibited as long as an external call is not satisfied.

All direct access circuits occupied:

In each RR circuit the conductor IP is connected through a diode D161 to a conductor OF. In the occupancy marker device MO, FIG. 9, said conductor OF is connected to the base of a transistor Tor the collector of which is connected to the battery and the base through a resistance R3111, and the emitter of which is connected to a grounded relay coil OF. Said relay controls a work contact of1 connected to the ground and, through diodes D310 to the various conductors ORT to the DCM2 to DCM35 circuits. Consequently when all the external lines to a same direct access group are not all occupied, ground is applied to the conductor OF through a contact *or*1 and the diode D161, and the transistor Tor is blocked. On the other hand, when all the lines are occupied, the ground disappers from the conductor OF, the transistor Tor is unblocked and the relay OF switched to its work condition with its contacts *of*1 now closed. Consequently a ground is applied to all the ORT conductors. In the DCM2 to DCM35 circuits, the conductor ORT is connected through a rest contact *cca*4 of the relay CC to the conductor OIR. Consequently said conductor OIR is connected to the ground in any position which is not in communication condition and the lamp OIR is steadily lighted for signalling occupancy of all the external network lines to the equipment.

Common circuits COM - FIG. 10:

Said circuits comprises two generators, OCA for controlling the rhythm of the calls and OCL for controlling the flickering of the lamps. It may be further provided, as shown, a generator OCT of an audible tone frequency and a generator OCS for supplying an emergency voltage at the mains frequency to the normal supply transformer of the equipment when a mains failure occurs.

The OCA and OCL generators are quite conventional and are connected to the ground through a work contact of a relay MMA which is connected to the 24 volt battery and to the emitter of a transistor T401 the collector of which is grounded and the base connected through a resistance R407 and to a conductor MMA. Said conductor is connected in each DCM circuit to the conductor OCM through a diode D04 and consequently the relay MMA is actuated to work condition and the generators activated each time a ground is applied to one of the OCM conductors for unblocking the transistor T410 and setting the relay MMA to its work condition.

The generator OCA is connected to a relay RA which controls a contact ra1 serially connected in the conductor RA to the call transformer TA. It further comprises a series transistor T402 the emitter of which is connected to ground and the collector to the conductor DA.

The generator OCL operates at a frequency of 1 Hz for instance and comprises two output transistors T403 and T404 to which are respectively connected the conductor CAD connected to the conductor 13 and the conductor CAN, the impulses being of opposite phases from CAD to CAN.

The generator OCT operates at a frequency which may be about 500 Hz and comprises an output transistor T405 the collector of which is connected to the battery through a resistance R408, to the conductor TON through a condenser C401 and to the conductor 15 through a condenser C402.

The generator OCS feeds an emergency transformer TCS which is connected to the transformers TFAL, TFCM and TA and to the main supply transformer through rest contacts *ts*3 and *ts*4 of a relay TS which is fed from the mains and shunt connected across the two leads of said mains.

What is claimed is:

1. A telephone switching and intercom equipment comprising an operator's position and a plurality of subsidiary positions, intercom position connecting circuits each having a conversation line extension selectively connectable to the position conversation lines and external line connecting circuits each having direct accessing to and from the operator's position and each having direct accessing from subsidiary positions through conversation line extensions selectively connectable to the position conversation lines; each position being provided with hook controlled work contacts for closure of the conversation line of the position and subsidiary positions being provided with external line connection dialing means; said operator's position being provided with keyboard actuated facilities for direct position selections, external line selections and temporary holdings of communications from the external line, wherein:

each subsidiary position comprises keyboard actuated facilities for intercom direct position selections and at least part of said positions are each provided with an external line connecting circuit request key, each direct position selection key and each external line connecting circuit request key having a work contact temporarily opening the conversation line of the position, a call marker device connected to all the direct position selection keys of the positions and having as many outputs as are positions respectively activated responsive to selective activations of the input connections thereof, as many call marker connecting circuits as there are positions each connected to an output of the call marker device and to a conversation line of the position corresponding to said output, each of the said circuits comprises a first output responsive to the closure of the conversation line, a second output responsive to a temporary opening of the conversation line from the actuation of a key at the position, a third output responsive to the activation of the output of the call marker device connected to the circuit and a further output responsive to the activation of the said call marker output and controlling actuation of a buzzer at the position of the conversation line to which said circuit is connected, each intercom position connecting circuit comprising as many communication routing blocks as there are positions, through each of which passes the conversation line of a position and passes the conversation line extension of an intercom relay circuit wherein the conductors of the conversation line extension pass through balanced coils of a pair of relays, each communication routing block comprising electronic switches across the conversation line and the conversation line extension thereof and a control gate circuit arrangement of said electronic switches, said control gate circuit arrangement having selection control inputs respectively connected to the said first, second and third outputs of the call marker connecting device of the position the conversation line of which passes through the block and having unblocking inputs and activation marking outputs, and said intercom relay circuit comprising a two-condition member, a first condition of which marks availability of the conversation line extension thereof and a second condition marking the unavailability of the intercom relay circuit, and having an output activated in the first condition thereof and connected to the unblocking inputs of the communication routing blocks of the intercom position connecting circuit, said intercom relay circuit comprising means responsive to the activation of an output in one of the communication routing blocks of the intercom position connecting circuit for controlling said two-condition member to its second condition, the said two-condition members being interconnected in a chaining arrangement wherein a single one of the said members can be in the said first condition thereof, and, each communication routing block activation marking output controls in the intercom relay means, a circuit applying an authorization voltage to all the inputs of the communication routing blocks up to the actuation of the relay SB marking the establishment of a communication between two positions through their respective communication routing blocks of the intercom position connecting circuit.

2. A telephone switching and intercom equipment according to claim 1, wherein:

the external line connecting circuit request keys are connected to the call marker device for responsive activation of an output therof, each external line connecting circuit comprises a two-condition request input circuit, a first condition of which marks availability of the external line connecting circuit and the second condition of which marks unavailability of the said circuit, and said two-condition request input circuits are connected in a chained arrangement the input of which is connected to the said output of the call marker device, wherein each request input circuit interrupts the chain when in its first condition and extends the chain to the next request input circuit when in its second condition, each external line connecting circuit comprises as many external line access blocks as there are positions provided with an external line connecting circuit request key, the respective conversation lines of which pass through said blocks, each of said blocks having a conversation extension line passing therethrough and electronic switches connected across said conversation line extension and said conversation line and comprising a control gate arrangement for said switches having selection control inputs respectively connected to the outputs of the call marker connecting circuit to which the said conversation line is connected and having an unblocking input controlled from the said two-condition request input of the external line connecting circuit, and each external line connecting circuit comprises an external communication relay circuit wherein the conductors of the said conversation line extension pass through balanced coils of a pair of relays, wherein an output of the said two-condition request input is connected to an actuation circuit of an occupancy marking relay of the external line connecting circuit, work contacts of which connect the external line to the conversation line extension of the circuit, and further controls actuation of an external line call marking relay of the said external communication relay circuit.

3. A telephone switching and intercom equipment according to claim 2, wherein:

the said two-condition members chaining arrangement of the intercom position connecting circuits is provided with a disabling input the activation of which blocks the availability marking two-condition member thereof, each two-condition input request circuit of the external line connecting circuits comprises a contact of one of the relays through which passes the conversation extension line of the said connecting circuit, said one relay being de-actuated responsive to the opening of a conversation line in an external line access block through which extends said conversation line extension, each external line access block comprises circuit means unblocked in activated condition of the block, responsive to an activation of the output of the call marker connecting circuit to which is connected the conversation line of said block, and having an input connected to a control input of the external communication relay means to which it is connected, said external communication relay means comprises a circuit responsive to the activation of the said control input for activating an output lead connected to the said disabling input of the two-condition member chaining arrangement of the intercom position connecting circuits and further controlling the actuation of an external line connection holding relay which relay is provided with a self-sustaining circuit including a member which is conducting in the first condition of the two-condition input request circuit of said external communication relay means.

4. A telephone switching and intercom equipment according to claim 2, wherein:

an occupancy marker device comprises as many two-condition members as there are positions in the equipment, each of the said members having a multiple output lead, each position comprises as many two-condition visual display members as are positions, each having a control input connected to a corresponding one of the said multiple output leads of the occupancy marker device, each call marker connecting circuit comprises an output connected to one of the said two-condition members of the occupancy marker device and each such output is activated in response to the activation of the third output of said circuit, each intercom communication routing block and each external line access block comprises a circuit detecting establishment of a communication with the position to which it is connected and having an output connected to the said output of the call marker connecting circuit connected to the same conversation line as the block.

5. A telephone switching and intercom equipment according to claim 4, wherein:

each two-condition visual display member is a lamp contained within the casing of the key of the position to which it is allotted.

6. A telephone switching and intercom equipment according to claim 4, wherein:

each subsidiary position is provided with an external connecting circuit request key, comprises a further two-condition visual display member having a control input, each external communication relay means has a further output lead activated from a work contact of the occupancy marking relay thereof, and, the occupancy marker device comprises a two-condition member responsive to an AND-condition of the said further output leads from said external communication relay means and having a multipled output to all the control inputs of the visual display members through individual connections each passing through a member of the corresponding call marker connecting circuit which breaks said connection in an unactivated condition of said circuit.

7. A telephone switching and intercom equipment according to claim 6 wherein:

each external line selection key of the operator's position has a two-condition visual display member and each external line holding key of the operator's position has a two condition visual display member, actuation of an external line selection key unblocks a switch in the external communication relay means and the output of said switch is connected to the second output of the call marker connecting circuit of the operator's position and the input lead from said key in said external communication relay means is connected to the external line access block unblocking output for enabling selection of the access block of the operator's position from which through a return lead to the external communication relay means the actuation circuit of the occupancy marking relay is energized, a contact of said relay blocking the two-condition request input circuit of the external communication relay means, in each external line access block through which passes the operator's position conversation line, an output lead is activated from activation of a member marking an activated condition of said block and said lead is connected in the corresponding external communication relay means to a switch the output of which is connected to an output lead to the corresponding two-condition visual display member at the operator's position, in each external communication relay means the actuation of an incoming call marking relay controls at a work contact thereof the activation at the operator's position of the two-condition visual display member corresponding to the external line connecting circuit, actuation of an external line holding key at the operator's position activates, through the said output lead of the external line access block, a circuit controlling application of a pulsed current to the two-condition visual display member associated with the said external line holding key and also activates directly the external line holding relay of the external communication relay means, a work contact of which also applies the said pulsed current to the two-condition visual display member associated with the external line selection key of the external line connecting circuit of which said relay means and access block are parts.

8. A telephone switching and intercom equipment according to claim 2, wherein:

said call marker device is connected to incoming leads from said operations and subsidiary positions, each key of each keyboard of a subsidiary position and each direct position selection key of the operator's position keyboard controls first and second contacts selectively connected to said incoming leads according to a recurrent distribution of connections through oppositely directed unidirectional elements, one/half of the keys in each keyboard having a contact opening one of the conversation line conductors of the positions and the other half of the keys in each keyboard having a contact opening the other conductor of the conversation line, each call marker connecting circuit comprises means to which are respectively connected the conductors of the conversation line to which it is connected, and said means respectively activates first or second output leads to distinct control inputs of the call marker device, responsive to an opening of a conductor of the conversation line, said combination inputs of the call marker device comprise first and second sets of two-position members, each set having a number of members twice the number of the said incoming leads and having its members selectively connected to said leads through unidirectional elements of opposite directions from the first to the second set, one/half of the said two-position members in each of the sets having an activation input connected to one of the control inputs and the other hald of the said two-position members in each of the sets having an activation input connected to the second of the said control inputs, and the outputs of the said first and second sets are distributed in distinctive pairs, each of which constitutes an activation input of an electronic switch the output of which is connected to an output of said call marker device.

9. A telephone switching and intercom equipment according to claim 4, wherein:

each multiple output lead of said occupancy marker device is connected through oppositely directed unidirectional elements to two of the said two-condition members, each one of the said two-condition visual display members of each position is connected to one of the said multiple output leads through a unidirectional element which is connected oppositely to a unidirectional element connecting another one of the said two-condition visual display members to the same multiple output lead.

10. A telephone switching and intercom equipment according to claim 8, wherein:

each contact of a key which opens a conversation line conductor applies an A.C. electrical current to said conductor, the conversation line conductors are each connected in the call marker connecting circuit to a resistor the other end of which is connected to an output lead to said call marker device and across which is connected a bridge rectifier controlling from its D.C. output, across which a condenser is connected, an electronic switch having an output connected to the said second output of the call marker connecting circuit and having a further output to a lead connected, in each and all the call marker connecting circuits of the equipment to the actuation ciruit of a relay, work contacts of which connect the conductors of the conversation line in a circuit responsive to the opening of the said conversation line for activation of the said first output of the call marker connecting device.

11. A telephone switching and intercom equipment according to claim 2, wherein:

the conversation line of said operator's position extends as conductors through all the call marker connecting circuits of said subsidiary positions, the second output of said call marker connecting circuit of the operator's position is connected to a lead extending through all the call marker connecting circuits of said subsidiary positions, in each call marker connecting circuit of a subsidiary position, electronic switches are connected across the conductors of the conversation line of the position and the conductors and an input activating gate of said switches comprises a control input connected to the said lead and a further control input connected to a member activated from the call marker device output connected to the said call marker connecting circuit.

12. A telephone switching and intercom equipment according to claim 11, wherein:

an interrupted current lead extends through all the call marker connecting circuits of the subsidiary positions and is connected to an input of the said electronic switches.

13. A telephone switching and intercom equipment according to claim 2 wherein:

each of the pair of relays of said intercom relay circuits and of said external communication relay circuit comprises first and second balanced coils in each relay thereof, the first coils of the said pair of relays being respectively connected to conductors of said conversation line extension, and the second coils of the said pair of relays are connected to a conductor of said conversation line extension and to a battery supply, the conversation line extension conductors are interconnected by a resistance condenser network, the resistance member of which is shunted by a work contact of the corresponding relay of the pair, and the second coils of said pair of relays are connected to ground through a gating circuit.

* * * * *